(12) United States Patent
Hwang et al.

(10) Patent No.: US 11,218,851 B2
(45) Date of Patent: Jan. 4, 2022

(54) DEVICE AND METHOD FOR V2X COMMUNICATION

(71) Applicant: LG ELECTRONICS INC., Seoul (KR)

(72) Inventors: Jaeho Hwang, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/651,308

(22) PCT Filed: Sep. 29, 2017

(86) PCT No.: PCT/KR2017/010990
§ 371 (c)(1),
(2) Date: Mar. 26, 2020

(87) PCT Pub. No.: WO2019/066108
PCT Pub. Date: Apr. 4, 2019

(65) Prior Publication Data
US 2020/0228946 A1    Jul. 16, 2020

(51) Int. Cl.
*H04B 7/00* (2006.01)
*H04W 4/40* (2018.01)
*H04W 4/38* (2018.01)

(52) U.S. Cl.
CPC ............. *H04W 4/40* (2018.02); *H04W 4/38* (2018.02)

(58) Field of Classification Search
CPC .......... H04W 4/40; H04W 4/38; H04W 4/44; G08G 1/0116; G08G 1/0133; G08G 1/0141; G08G 1/052; G08G 1/056
See application file for complete search history.

(56) References Cited

U.S. PATENT DOCUMENTS

2013/0272177 A1    10/2013    Wei et al.
2015/0103702 A1    4/2015    Lahetkangas et al.

FOREIGN PATENT DOCUMENTS

WO    2017150955    9/2017

OTHER PUBLICATIONS

'Realizing Collective Perception in a Vehicle'; Gunther et al., 2016, p. 1-8, IEEE.*
'The Potiontial of Collective Perception in Vehicular Ad-Hoc Networks', 2015, pp. 1-5, ITST.*
(Continued)

*Primary Examiner* — Khalid W Shaheed
(74) *Attorney, Agent, or Firm* — Lee, Hong, Degerman, Kang & Waimey

(57) ABSTRACT

Disclosed is a method by which a V2X communication device for a vehicle transmits a CPM message. The method for transmitting the CPM message comprises the steps of: determining a transmission mode of the CPM message for generating a collective perception for at least one object detected by the V2X communication device; and transmitting the CPM message on the basis of the transmission mode. The CPM message corresponds to a dynamic CPM message for transmitting dynamic data or a full CPM message for transmitting the dynamic data and static data, wherein the dynamic CPM message can include a dynamic container containing the dynamic data, and the full CPM message can include the dynamic container containing the dynamic data and the static container containing static data.

14 Claims, 32 Drawing Sheets

(56) References Cited

OTHER PUBLICATIONS

Huawei, "eV2X use case on Collective Perception of Environment," 3GPP TSG-SA WG1 Meeting #73, S1-161109, May 2016, 4 pages.
Korea Railroad Research Institute, "Corrections for Use Case Regarding Collective Perception of Environment," 3GPP TSG-SA WG1 Meeting #75, S1-162151, Aug. 2016, 3 pages.
PCT International Application No. PCT/KR2017/010990, International Searching Authority dated Jun. 21, 2018, 4 pages.
European Patent Office Application Serial No. 17926728.1, Search Report dated Feb. 9, 2021, 13 pages.
European Telecommunications Standards Institute (ESTI), "Intelligent Transport System (ITS); Vehicular Communications; Basic Set of Applications; Informative Report for the Collective Perception Service (Release 1)," ETSI TR 103 562 V0.0.1, Aug. 2017, 15 pages.
Kapsch Trafficom, "Input on CPS; For consideration in ETSI TR 103 562 and ETSI TS 103 324," Aug. 2017, 8 Pages.
Ulrich Brunsmann, et al., "Ko-Per spezifische Nachrichteninhalte" Mar. 2014, 36 Pages.

\* cited by examiner

【Fig. 1】
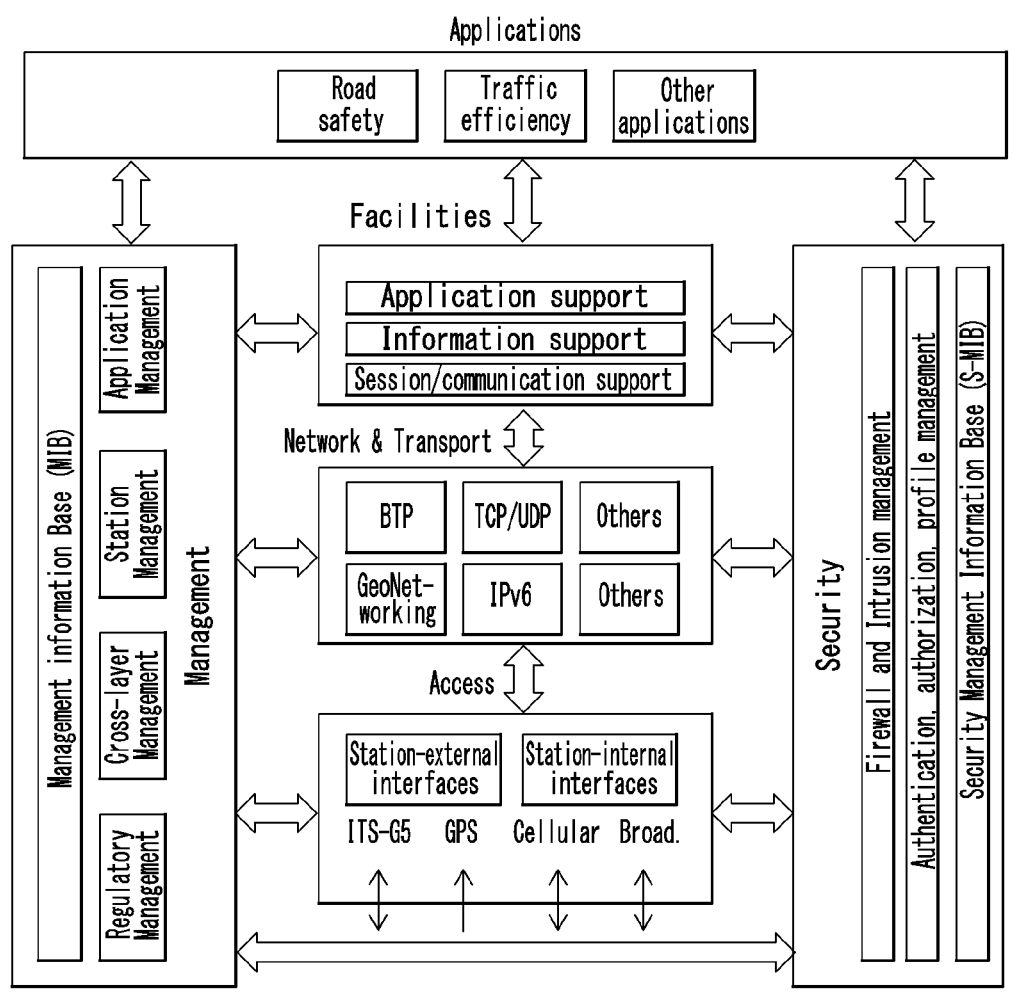

[Fig. 2]
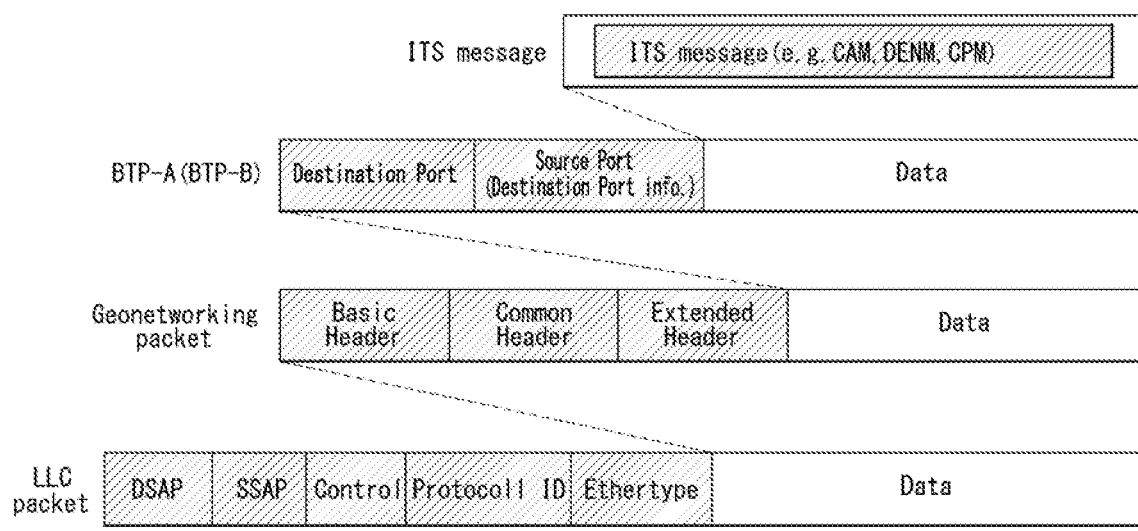

【Fig. 3】
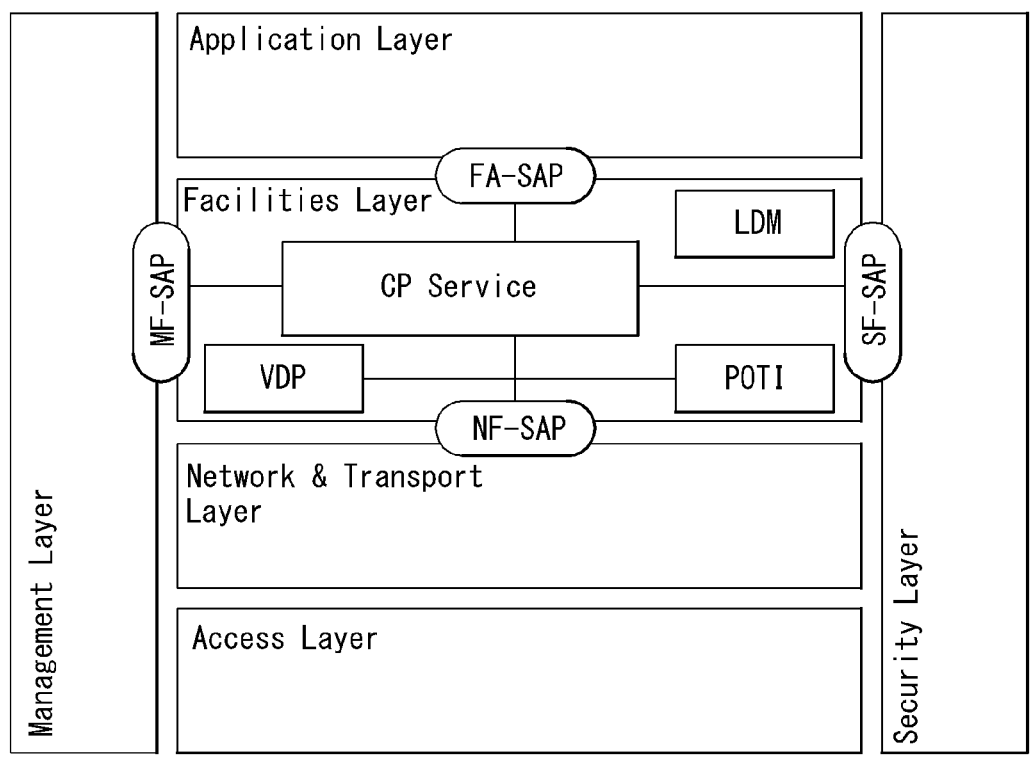

[Fig. 4]
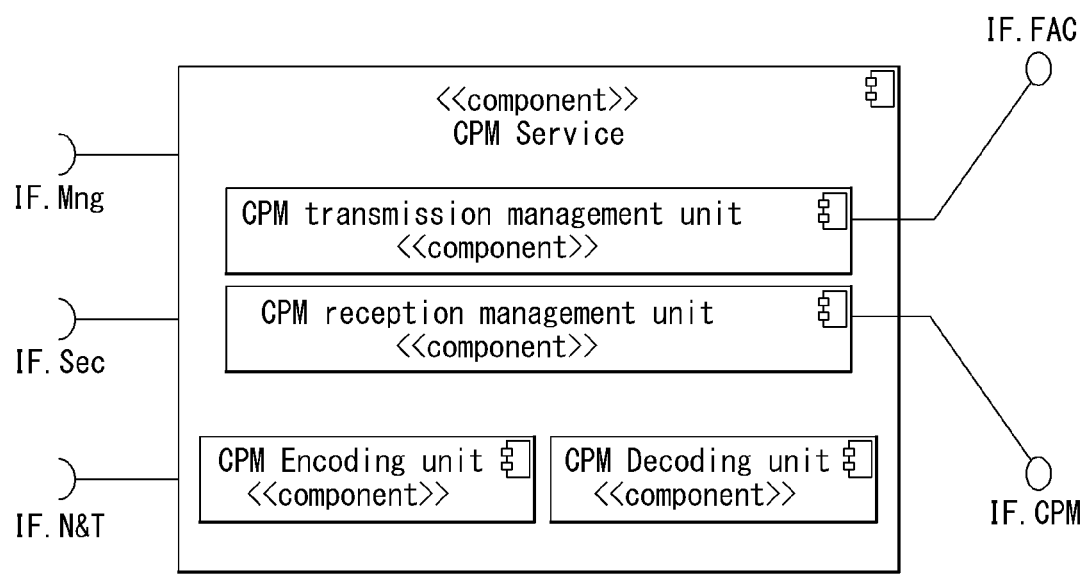

[Fig. 5]
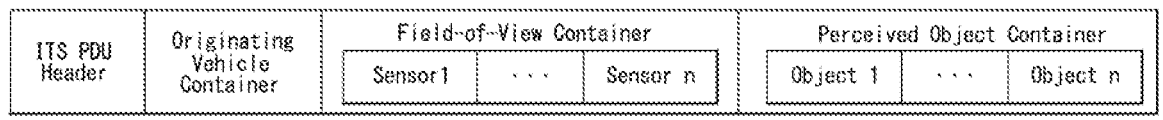

[Fig. 6]
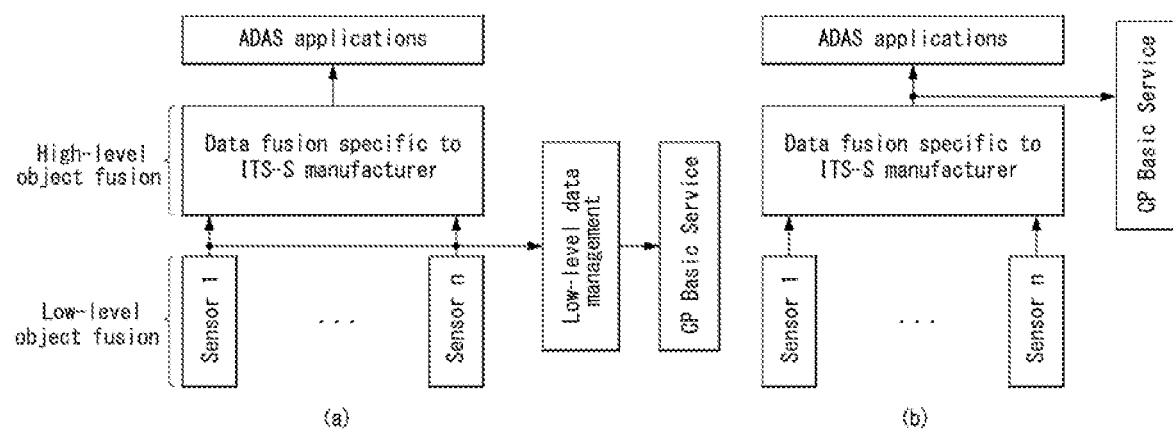

【Fig. 7】
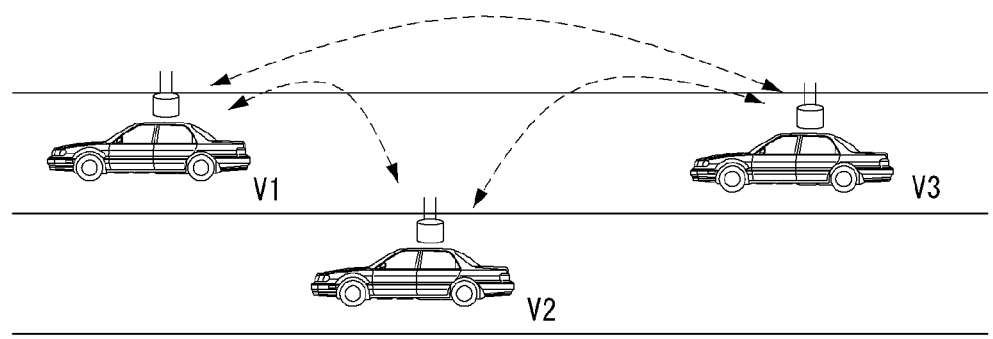

[Fig. 8]
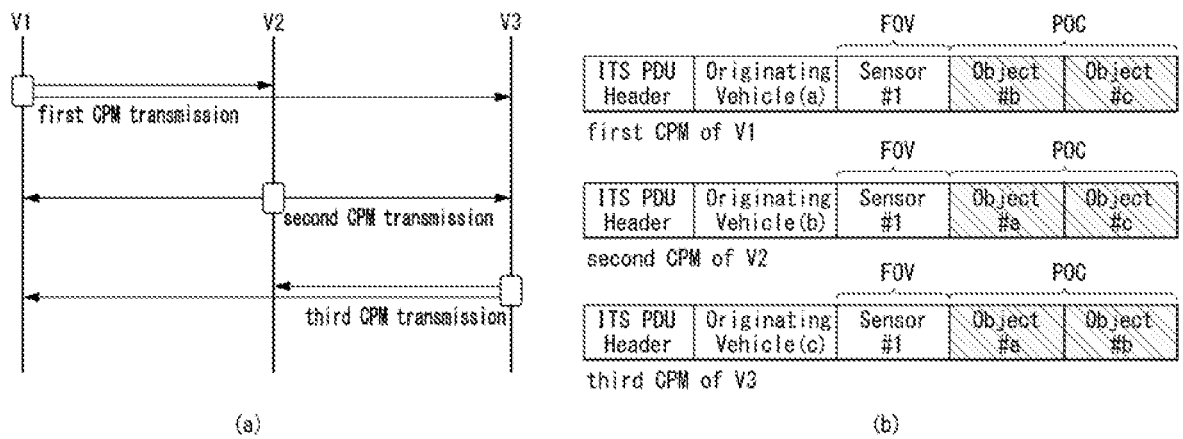

[Fig. 9]
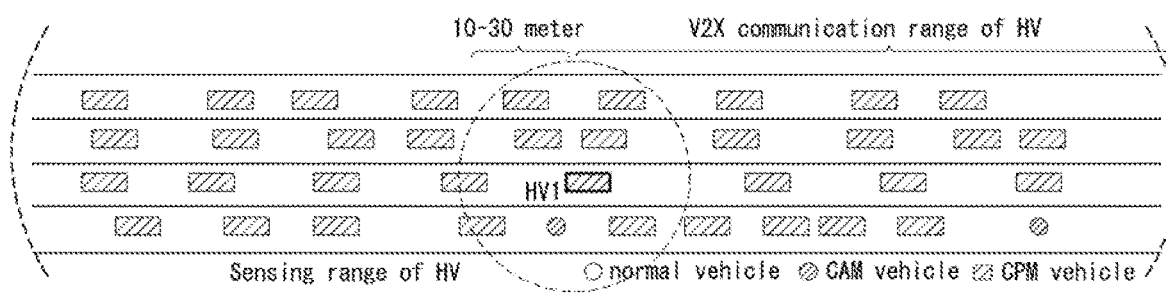

[Fig. 10]
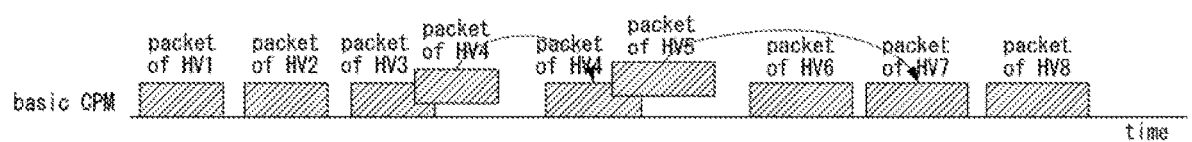

[Fig. 11]
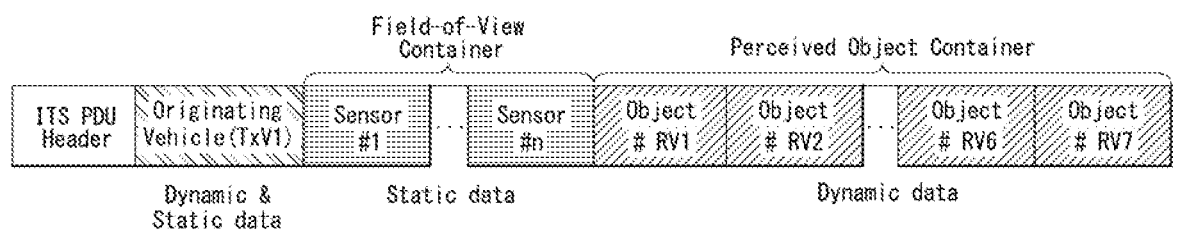

[Fig. 12]
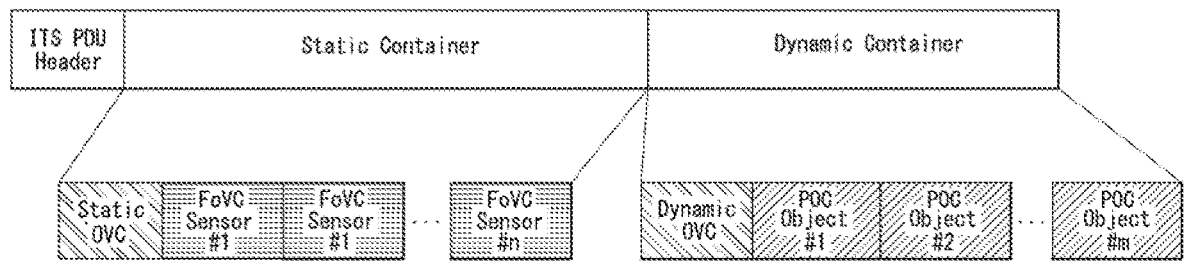

[Fig. 13]
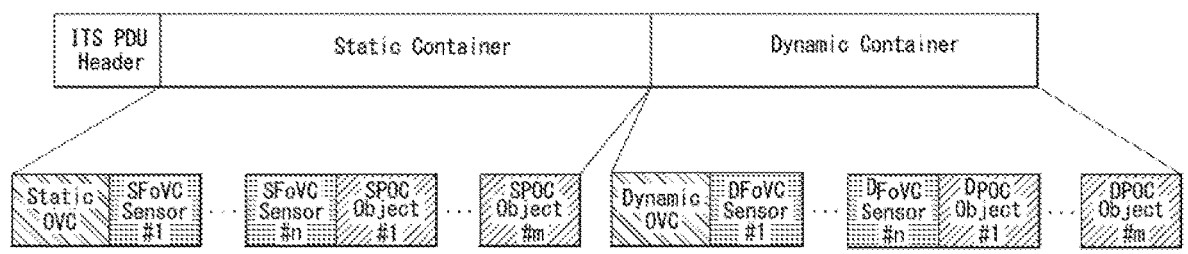

[Fig. 14]
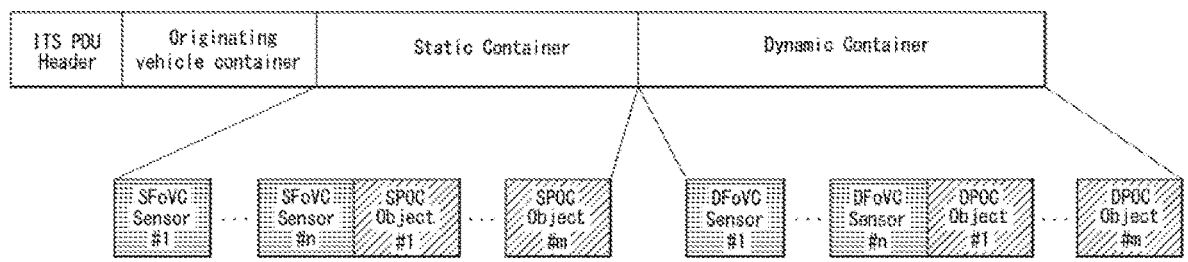

[Fig. 15]
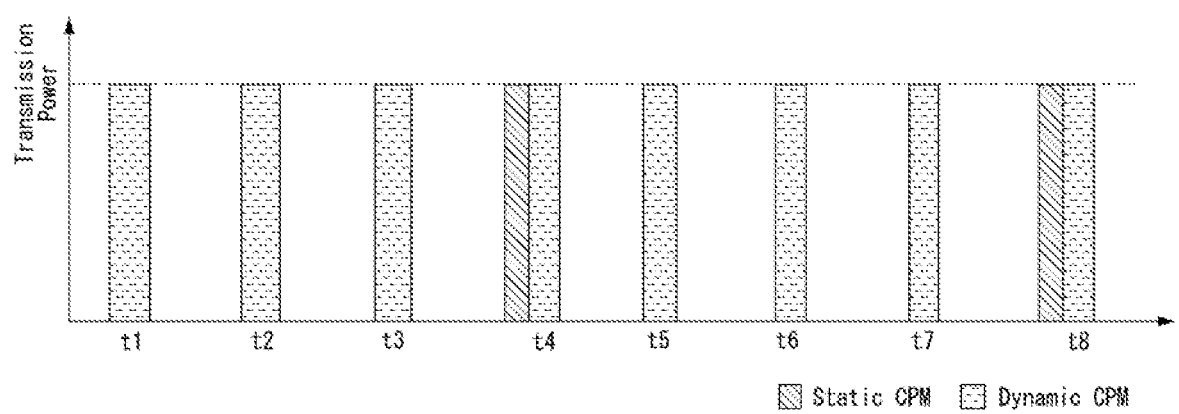

[Fig. 16A]
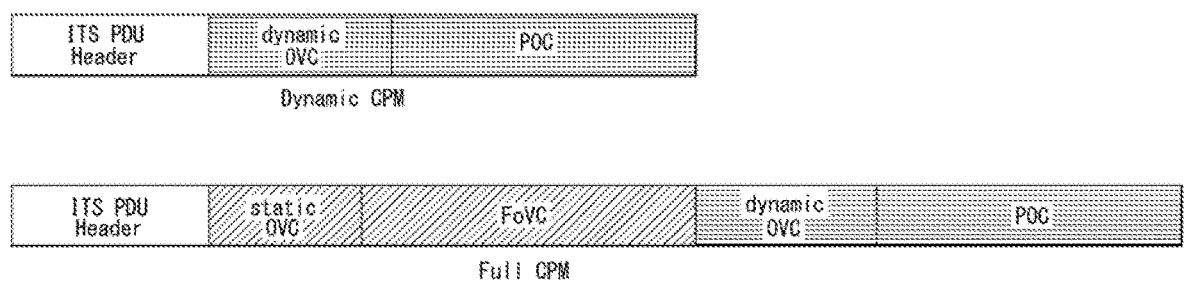

[Fig. 16B]
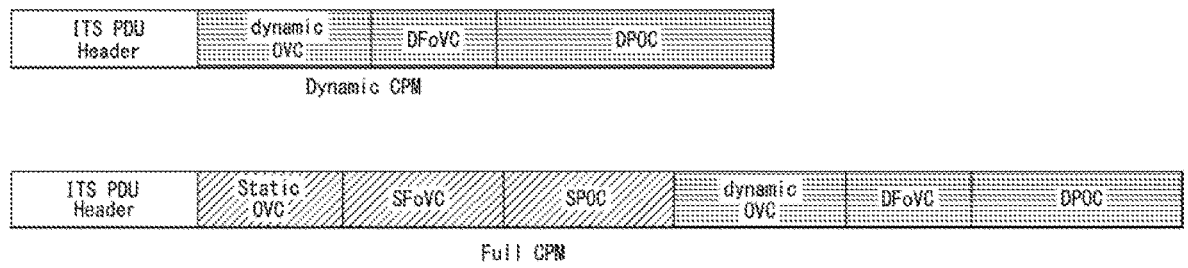

[Fig. 17A]
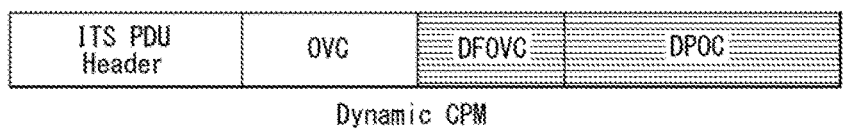

【Fig. 17B】
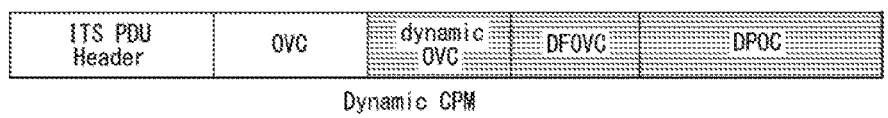

[Fig. 18]
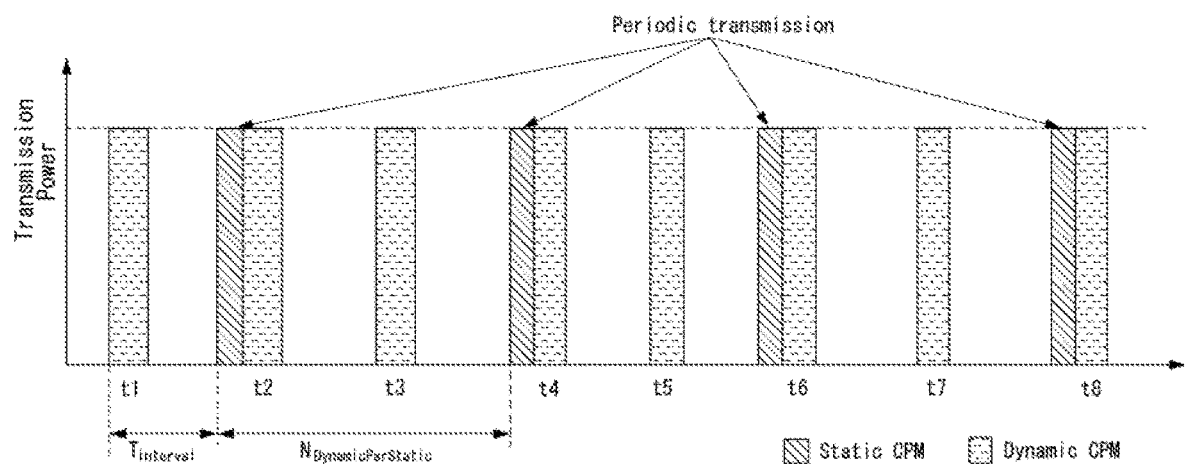

【Fig. 19】
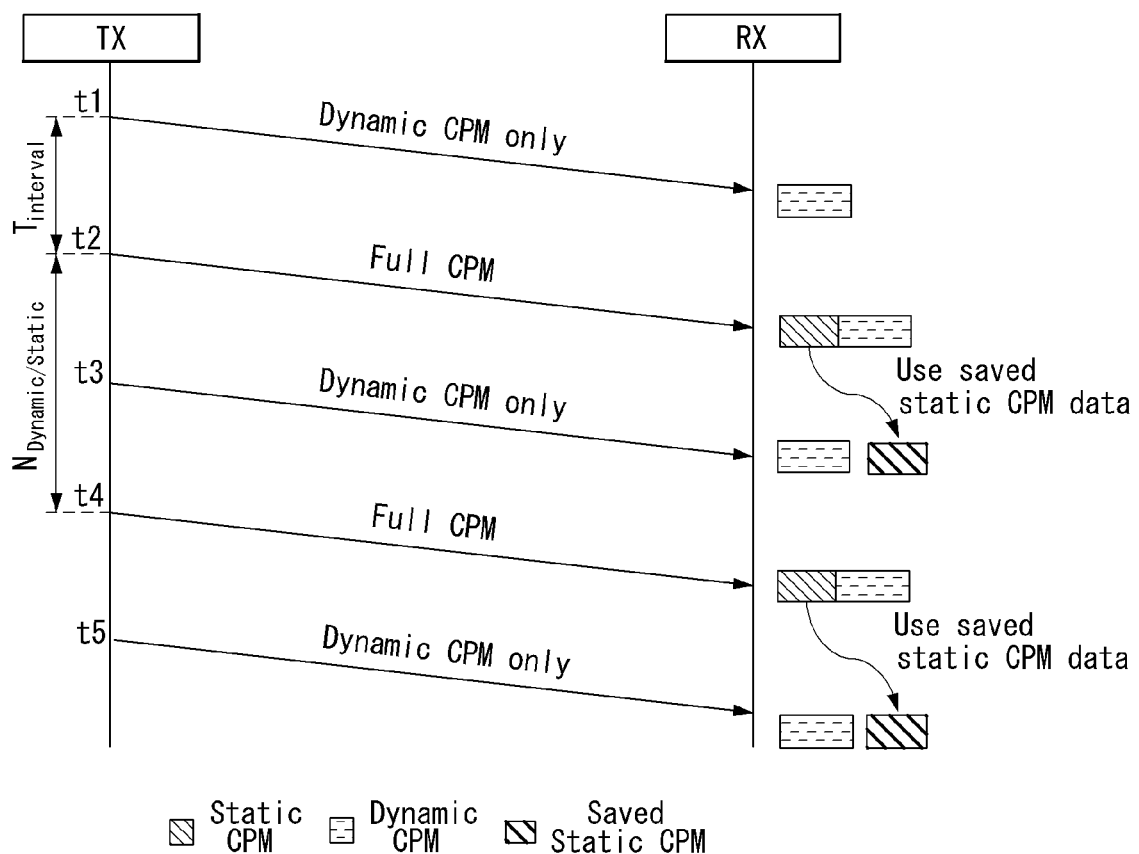

[Fig. 20]
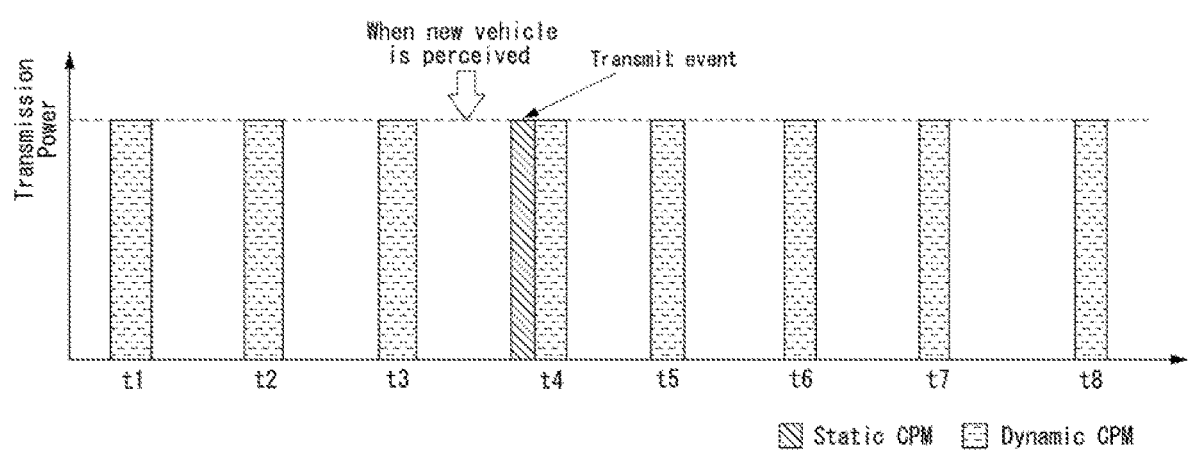

[Fig. 21]
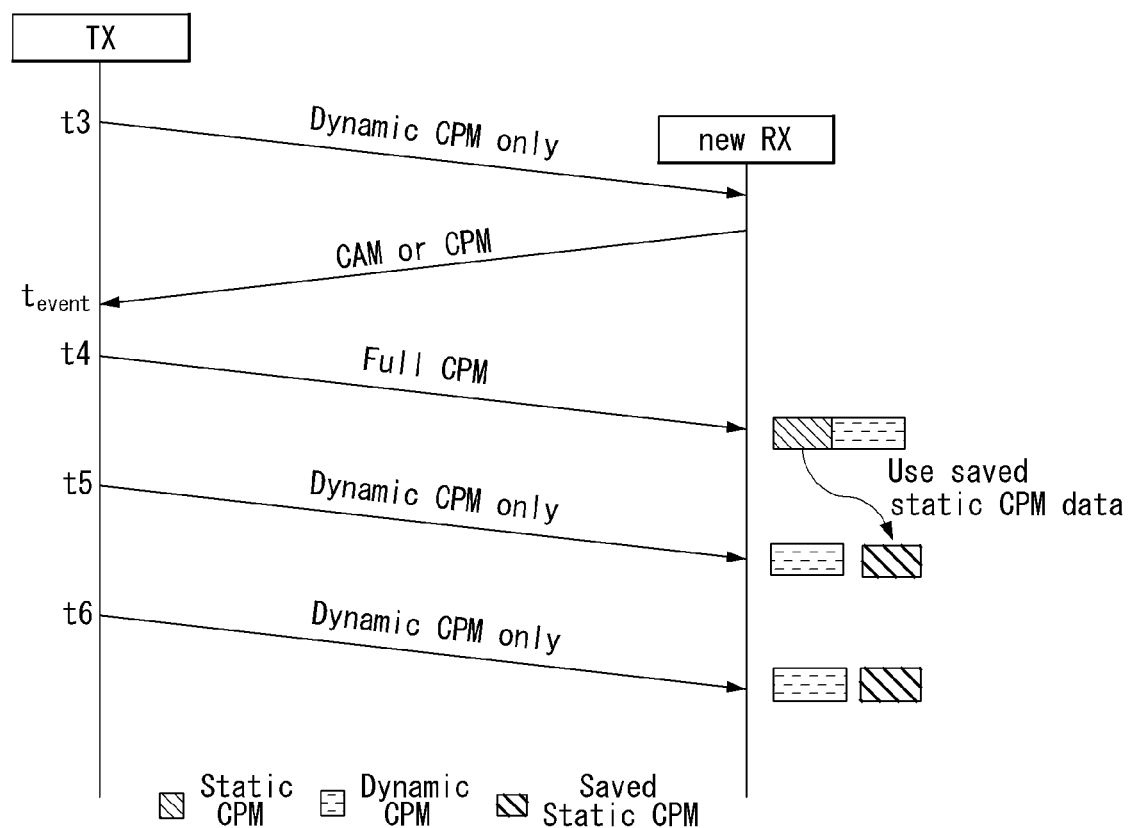

【Fig. 22】
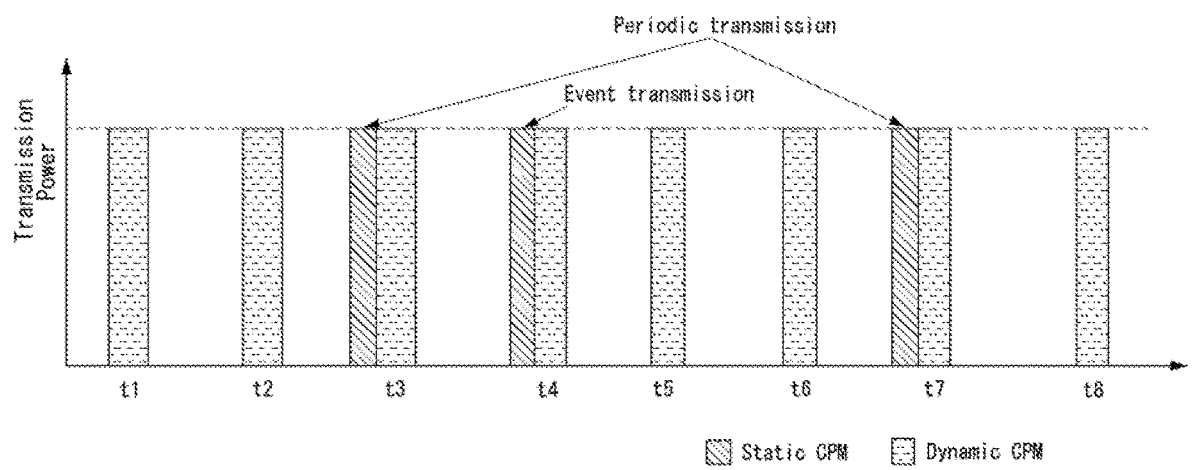

[Fig. 23]
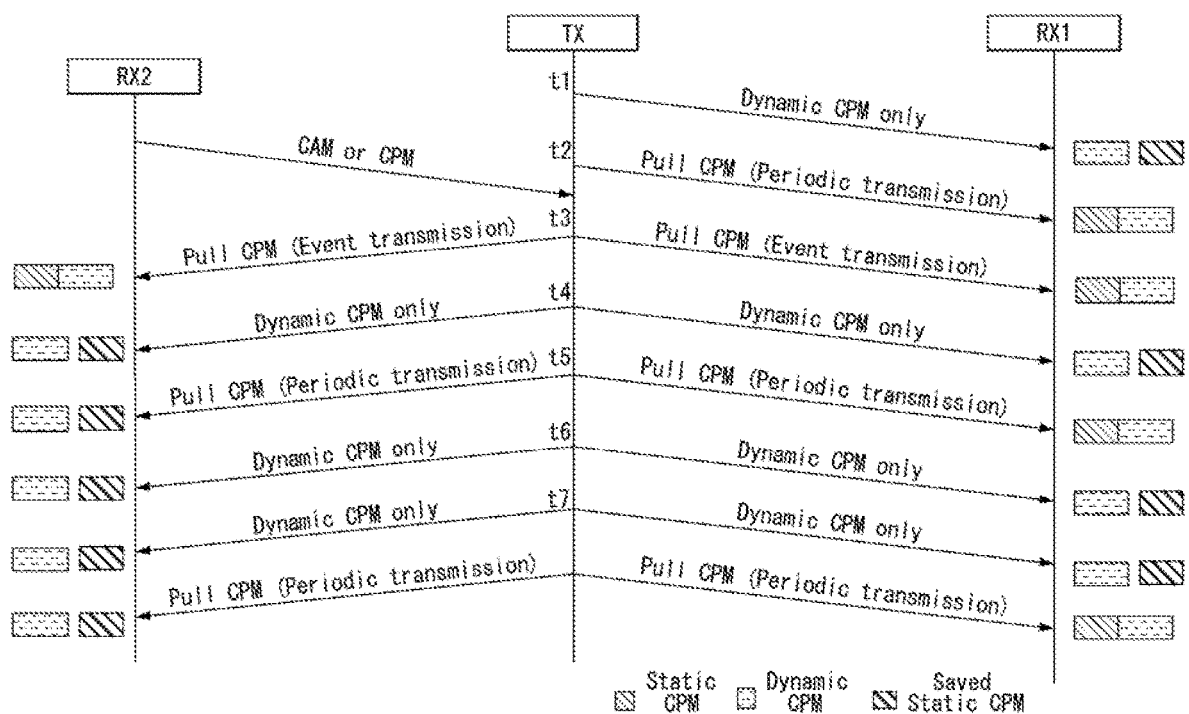

[Fig. 24]
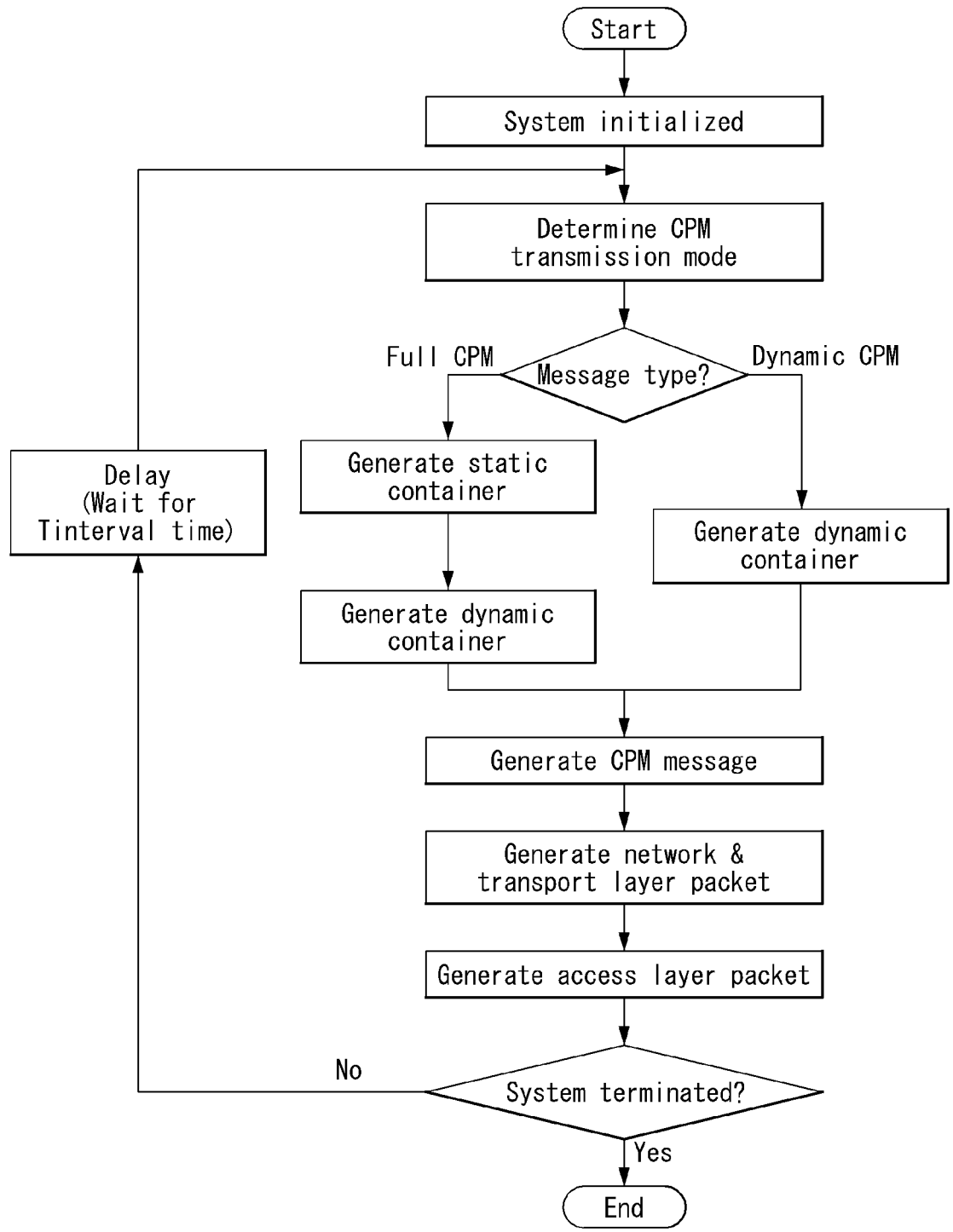

[Fig. 25]
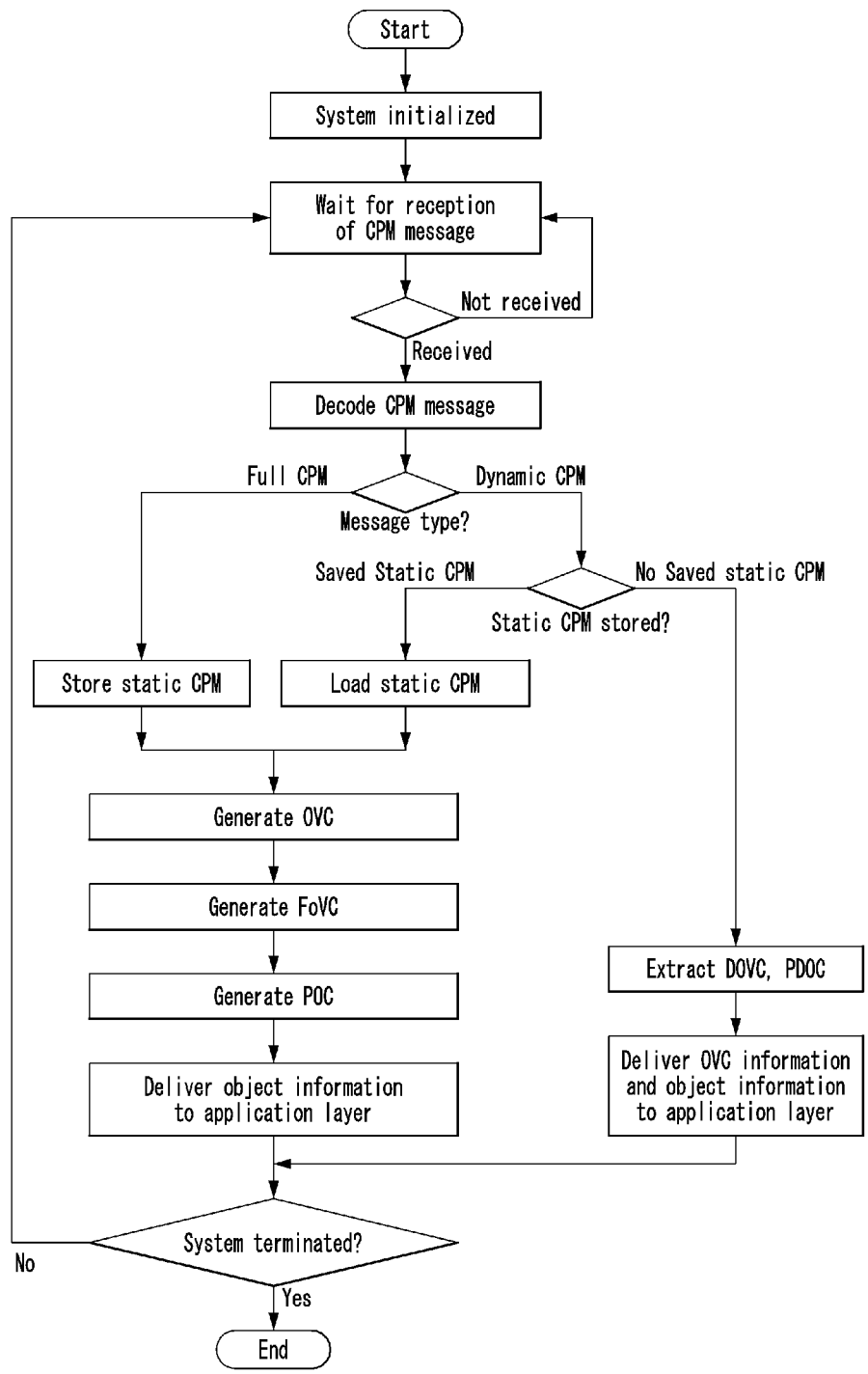

【Fig. 26A】
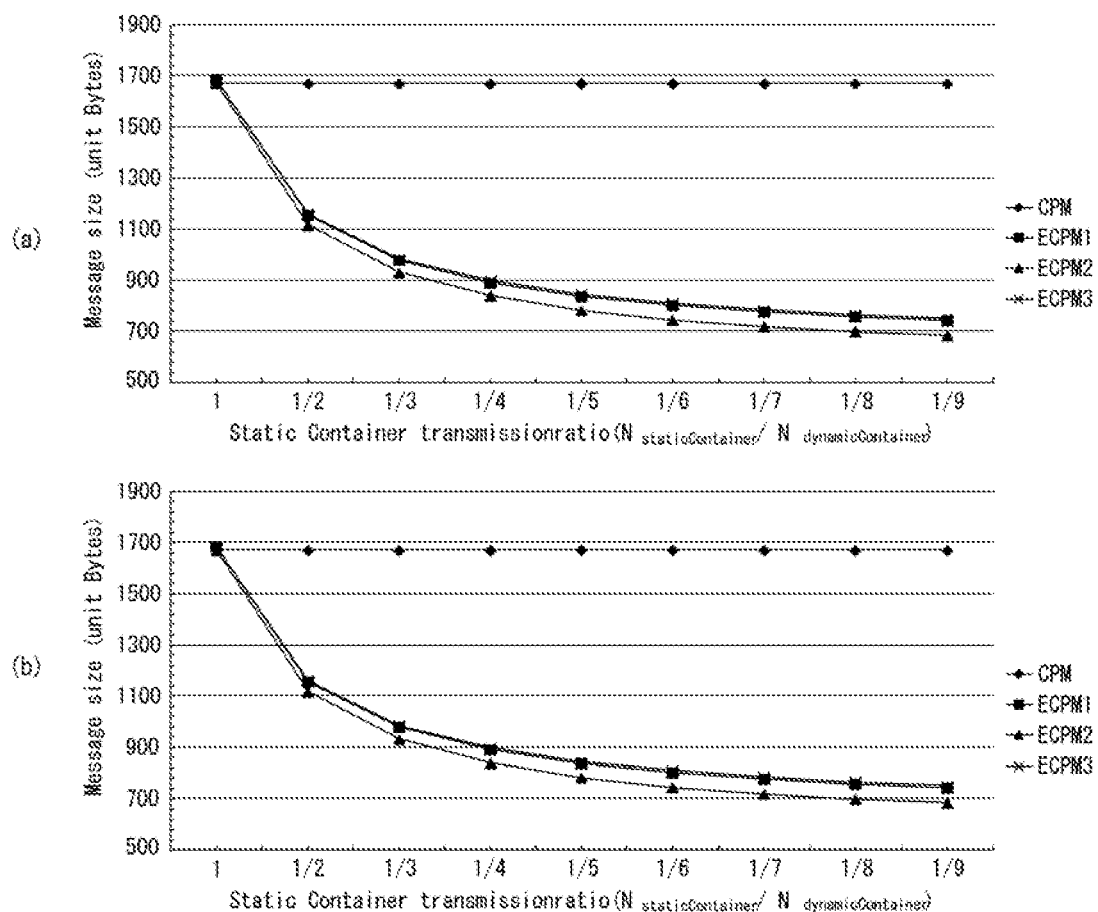

[Fig. 26B]
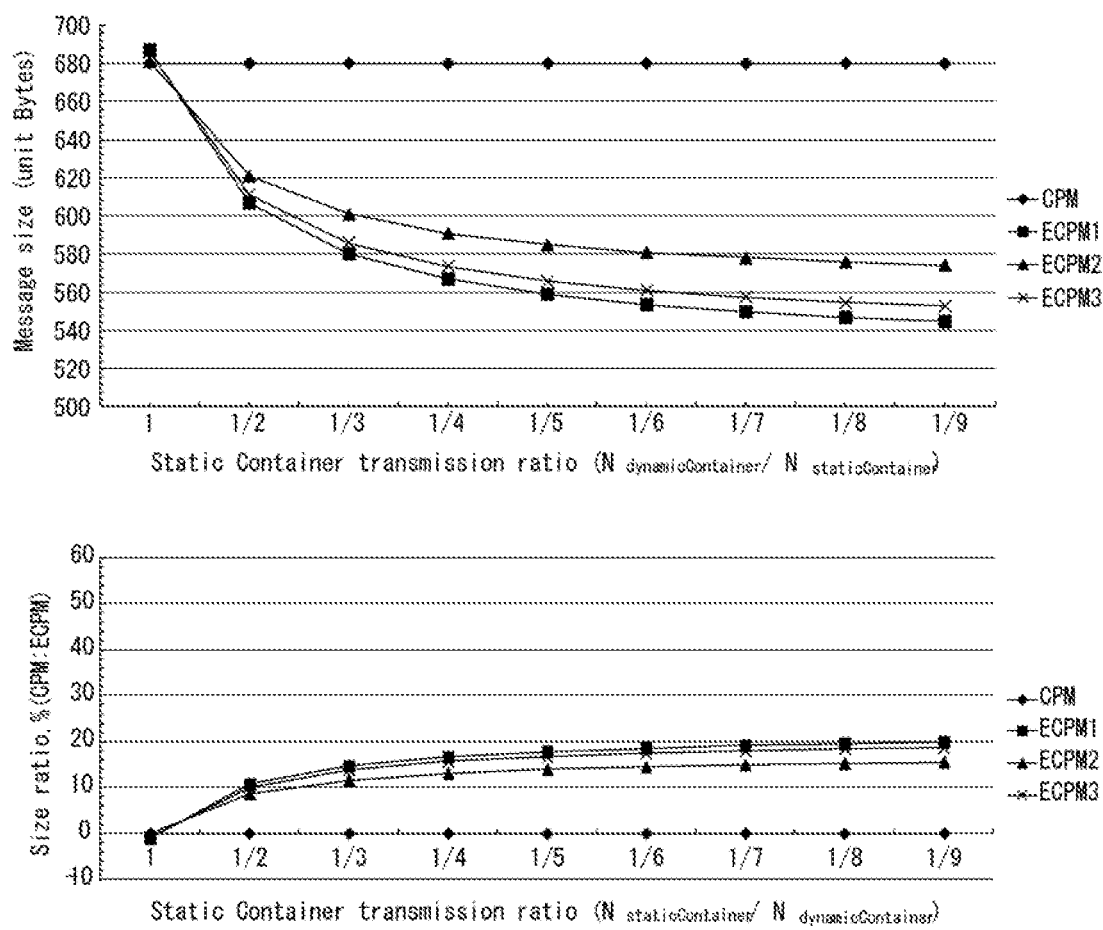

[Fig. 26C]
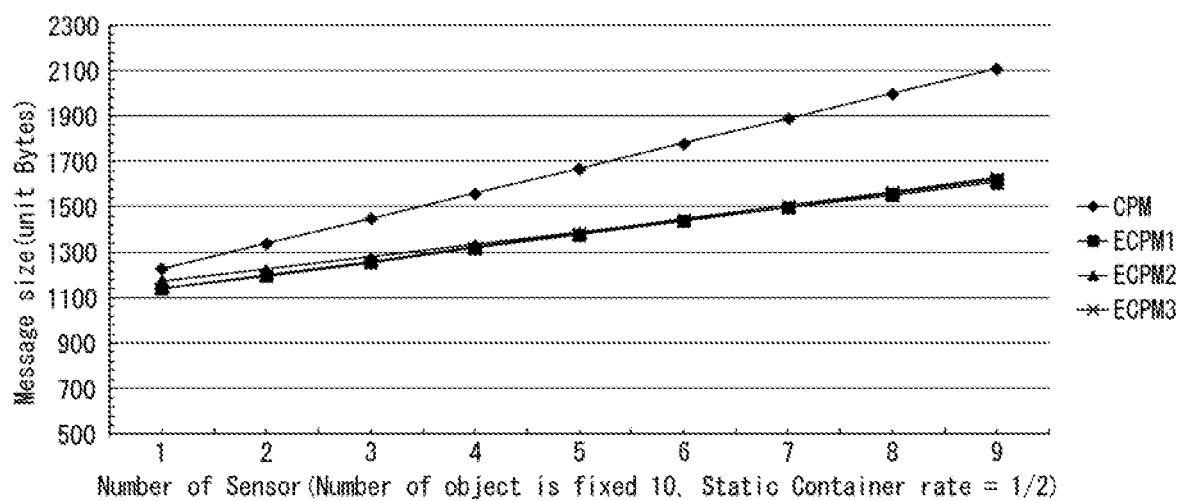
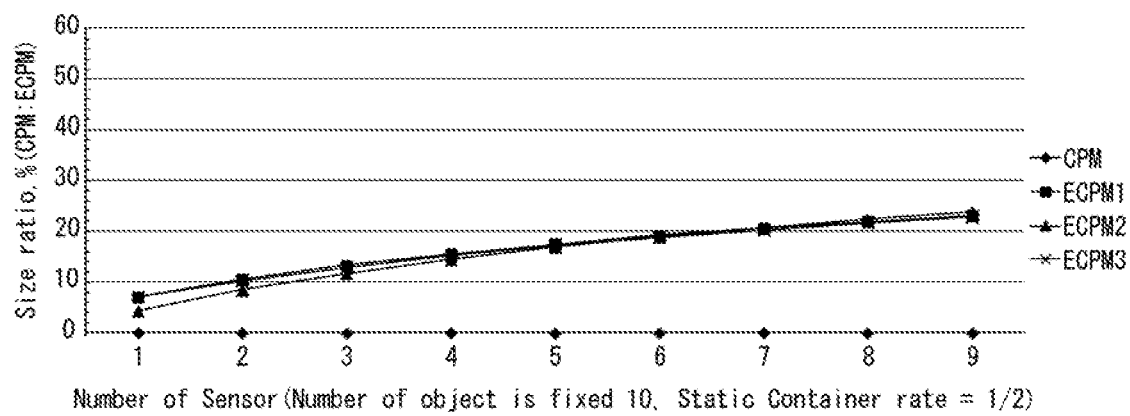

【Fig. 26D】
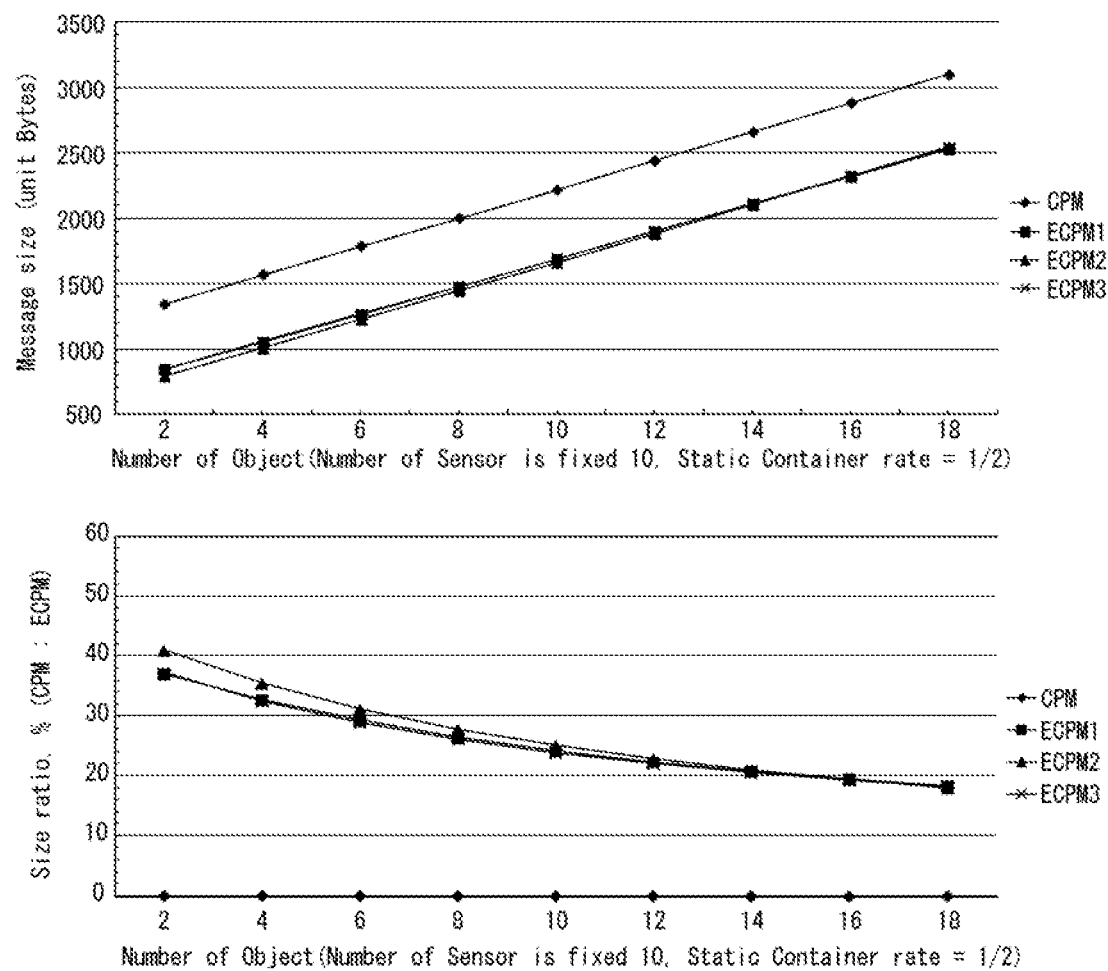

【Fig. 27】
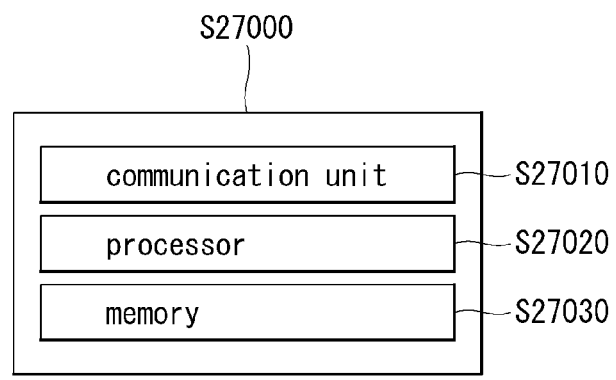
【Fig. 28】
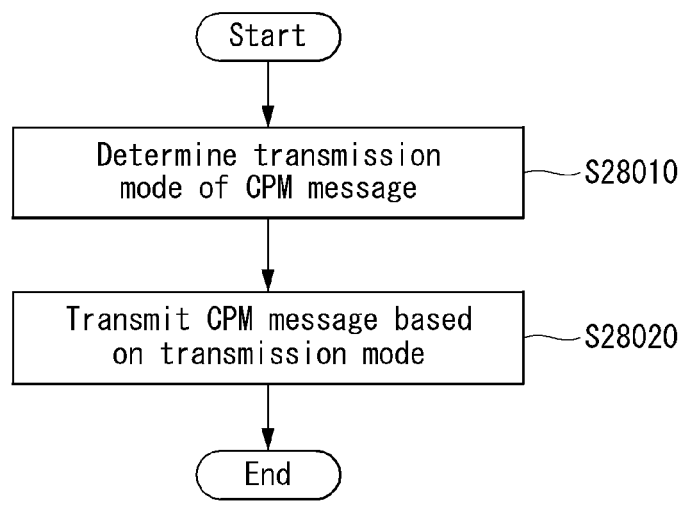

DEVICE AND METHOD FOR V2X COMMUNICATION

CROSS-REFERENCE TO RELATED APPLICATIONS

This application is the National Stage filing under 35 U.S.C. 371 of International Application No. PCT/KR2017/010990, filed on Sep. 29, 2017, the contents of which are all hereby incorporated by reference herein in their entirety.

TECHNICAL FIELD

The present disclosure relates to a device and method for V2X communication and, more particularly, to a method of transmitting or receiving, by a V2X communication device, a collective perception message (CPM).

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DISCLOSURE

Technical Problem

Various services may be provided through V2X communication. The ITS system of a vehicle performing V2X communication may provide various services for traffic safety and efficiency. One of the services is a cooperative awareness (CA) service. Cooperative awareness within road traffic means that a road user and roadside infrastructure can be aware of mutual positions, dynamics and attributes. Such awareness is a basic for several road safety and traffic efficiency applications.

As described above, the CA service can support traffic safety in such a manner that a V2X communication device periodically provides its own position and state to surrounding V2X communication devices. However, the CA service has limits in that only information of a corresponding V2X communication device itself can be shared. In order to supplement the limits, there is a need for the development of a service using a new method.

Technical Solution

The disclosure proposes a device and method for V2X communication.

A method of transmitting a collective perception message (CPM) message by a V2X communication device of a vehicle according to an embodiment of the disclosure may include determining a transmission mode of the CPM message for generating collective perception for at least one object detected by the V2X communication apparatus and transmitting the CPM message based on the transmission mode. The CPM message may correspond to any one of a dynamic CPM message for transmitting dynamic data or a full CPM message for transmitting dynamic data and static data, the dynamic CPM message may include a dynamic container including dynamic data. The full CPM message may include a dynamic container including the dynamic data and a static container including the static data.

In one embodiment, when the transmission mode is an interval transmission mode, transmitting the CPM message may include transmitting a CPM message corresponding to the dynamic CPM message in a first transmission interval, and transmitting a CPM message corresponding to the full CPM message in a second transmission interval different from the first transmission interval.

In one embodiment, the first transmission interval may be shorter than the second transmission interval.

In one embodiment, when the transmission mode may be an event trigger transmission mode, transmitting the CPM message may include periodically transmitting a CPM message corresponding to the dynamic CPM message and transmitting a CPM message corresponding to the full CPM message when a predefined event occurs.

In one embodiment, when the transmission mode is a hybrid transmission mode, transmitting the CPM message may include transmitting a CPM message corresponding to the dynamic CPM message in a first transmission interval, transmitting a CPM message corresponding to the full CPM message in a second transmission interval different from the first transmission interval, and further transmitting a CPM message corresponding to the full CPM message when a predefined event occurs.

In one embodiment, the dynamic container may include object information related to at least one object detected by a sensor of the V2X communication apparatus, and the static container may include sensor information related to the sensor of the V2X communication apparatus.

In one embodiment, the dynamic container may include dynamic object information having a dynamic characteristic among object information related to the at least one object detected by a sensor of the V2X communication apparatus, and may include dynamic sensor information having a dynamic characteristic among sensor information related to the sensor of the V2X communication apparatus. The static container may include static object information having a static characteristic among the object information and may include static sensor information having a static characteristic among the sensor information.

A V2X communication device of a vehicle according to an embodiment of the disclosure includes a memory storing data, a communication unit transmitting or receiving a radio signal including a collective perception message (CPM) message, and a processor configured to control the memory and the communication unit. The processor is configured to determine a transmission mode of the CPM message for generating collective perception for at least one object detected by the V2X communication apparatus and transmit the CPM message based on the transmission mode. The CPM message may correspond to any one of a dynamic CPM message for transmitting dynamic data or a full CPM message for transmitting dynamic data and static data. The dynamic CPM message may include a dynamic container including dynamic data. The full CPM message may include a dynamic container including the dynamic data and a static container including the static data.

Advantageous Effects

According to the disclosure, there is an advantage in that more useful data can be transmitted more frequently compared to the existing method while the same channel resource is used because CPM data included in a CPM message is divided into static CPM data and dynamic CPM data and the dynamic CPM data having high importance is transmitted in a shorter interval than the static CPM data.

Furthermore, when an event, such as the perception of a new vehicle, occurs, a radio frequency resource can be used more efficiently through a method of transmitting a CPM message including static CPM data compared to a method of periodically transmitting a CPM message including static CPM data.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the disclosure.

FIG. 2 illustrates a method of processing a V2X message according to an embodiment of the disclosure.

FIG. 3 illustrates architecture of the V2X communication device providing CP services according to an embodiment of the disclosure.

FIG. 4 illustrates a function block diagram CP services according to an embodiment of the disclosure.

FIG. 5 illustrates a CPM structure according to an embodiment of the disclosure.

FIG. 6 illustrates a method of extracting sensor data by a V2X communication device providing a CP service according to an embodiment of the disclosure.

FIG. 7 illustrates a method of communicating, by a V2X communication device according to an embodiment of the disclosure, with another V2X communication device and communication.

FIG. 8 illustrates a method of communicating, by a V2X communication device according to an embodiment of the disclosure, with another V2X communication device using a CPM.

FIG. 9 illustrates a method of transmitting a CPM by the V2X communication device according to an embodiment of the disclosure in a congestion environment.

FIG. 10 illustrates the state of a communication channel when the CPM structure of FIG. 5 is used.

FIG. 11 illustrates a method of classifying the type of data of a CPM according to an embodiment of the disclosure.

FIG. 12 illustrates the structure of a first type of a CPM message according to an embodiment of the disclosure.

FIG. 13 illustrates the structure of a second type of a CPM message according to an embodiment of the disclosure.

FIG. 14 illustrates the structure of a third type of a CPM message according to an embodiment of the disclosure.

FIG. 15 illustrates a method of operating a CPM message by the V2X communication device according to an embodiment of the disclosure.

FIG. 16 illustrates a method of operating the first type CPM message by the V2X communication device according to an embodiment of the disclosure.

FIG. 17 illustrates a method of operating the second type CPM message by the V2X communication device according to an embodiment of the disclosure.

FIG. 18 illustrates a method of operating a CPM message by the V2X communication device using an interval transmission method according to an embodiment of the disclosure.

FIG. 19 illustrates a method of transmitting, by the V2X communication device according to an embodiment of the disclosure, a CPM message using the interval transmission method.

FIG. 20 illustrates a method of operating a CPM message by the V2X communication device using an event trigger transmission method according to an embodiment of the disclosure.

FIG. 21 illustrates a method of transmitting, by the V2X communication device according to an embodiment of the disclosure, a CPM message using the event trigger transmission method.

FIG. 22 illustrates a method of operating a CPM message by the V2X communication device using a hybrid transmission method according to an embodiment of the disclosure.

FIG. 23 illustrates a method of transmitting, by the V2X communication device according to an embodiment of the disclosure, a CPM message using the hybrid transmission method.

FIG. 24 is a flowchart of a method of transmitting a CPM message by a transmission V2X communication device according to an embodiment of the disclosure.

FIG. 25 is a flowchart of a method of receiving a CPM message by a reception V2X communication device according to an embodiment of the disclosure.

FIG. 26 illustrates a performance comparison between CPM transmission using the existing CPM structure and CPM transmission using a new CPM message structure according to an embodiment of the disclosure.

FIG. 27 illustrates the configuration of the V2X communication device according to an embodiment of the disclosure.

FIG. 28 is a flowchart illustrating a method of transmitting a CPM message by the V2X communication device according to an embodiment of the disclosure.

BEST MODE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

Hereinafter, first, a collective perception (CP) service provided by the V2X communication device and a basic structure of a CP message (CPM) for the CP service are described. Furthermore, various embodiments of the CPM structure for performance improvements of the CP service are described. Meanwhile, in the present disclosure, various embodiments are described, assuming that the V2X communication device generating a CPM is called a V2X communication device of a vehicle. However, the embodiments may be applied to the V2X communication device of an RSU or a personal V2X communication device to be described later in the same or similar manner according to circumstances. In the present disclosure, a CPM may also be referred to as a CPM message.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 is a view illustrating a method of processing a V2X message according to an embodiment of the disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 is a view illustrating an exemplary architecture of an V2X communication device providing a CP service according to an embodiment of the disclosure.

The V2X communication device may provide various services for traffic safety and efficiency. One of the services may be a Cooperative Awareness (CA) service. The Cooperative Awareness in road traffic means that road users and roadside infrastructures can know mutual positions, dynamics and attributes. Here, the road users may be all kinds of users on a road or near a road, which act as traffic safety and control, such as a vehicle, a truck, a motorcycle, a bicycle or a pedestrian, and the roadside infrastructures may be equipment including a road sign, a traffic light or a barrier and an entrance.

This awareness of each other becomes basics of many road safety and traffic efficiency applications. This can be performed by regular exchange of information between road users at vehicle to vehicle (V2V), vehicle to infrastructure (V2I), infrastructure to vehicle (I2V) or everything to everything (X2X) which are based on a wireless network called a V2X network.

On this other hand, the cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices. In this case, the CA service may specify how the V2X communication device can inform its own position, dynamics and attributes by sending a Cooperative Awareness Message (CAM).

Thus, in regard to the CA service, the V2X communication device may periodically provide its own position and state to surrounding V2X communication devices, thereby supporting traffic safety. However, the CA service has a limitation in that only information of the corresponding V2X communication device itself can be shared. In order to overcome this limitation, it is necessary to develop services such as a collective perception (CP) service.

The CP service may specify how the V2X communication device can inform other V2X communication devices about the position, dynamics, and attributes of surrounding road users and other objects that are detected. For example, the CP service may share this information with other V2X communication devices through the transmission of Collective Perception Messages (CPM). This CP service may be an optional facility for all types of V2X communication devices (vehicle V2X communication device, road side V2X communication device, personal V2X communication device, etc.) participating in road traffic.

Hereinafter, a CPM transmitted by an V2X communication device participating in a V2X network and a CP service for transmitting the CPM will be described in detail with reference to FIG. 3. In this disclosure, the CPM may be a message exchanged between V2X communication devices via a V2X network, and may be used to generate collective perception for road users and other objects detected and/or recognized by the V2X communication device. In this case, the detected road user or object may be, but not limited to, a road user or an object which is not equipped with an V2X communication device.

As described above, the V2X communication device sharing information through the CAM shares only information about the state recognition of the V2X communication device itself with other V2X communication devices in order to generate cooperative awareness. In this case, since the road user or other objects unequipped with the V2X communication device are not a part of the system, a view about safety and traffic management related situations may be limited.

One method for improving this is that a system/device equipped with the V2X communication device and capable of recognizing road users and objects unequipped with the V2X communication device informs other V2X communication devices of the presence and state of these road users and objects unequipped with V2X device (or ITS-S). In order to easily improve the safety and traffic management performance, the CP service may recognize the cooperative awareness of the presence of the road user and the object unequipped with V2X device, and thereby may improve the safety and traffic management performance of the system equipped with the V2X communication device.

As shown in FIG. 3, the CP service may be a facilities layer entity that operates a CPM protocol. For example, the CP service may be a part of the application support domain of the facilities layer. FIG. 3 illustrates a logical interface for the CP service and other layers in the exemplary architecture of V2X communication device and a potential logical interface for entities in a facilities layer.

This CP service may provide two services, for example, sending and receiving of CPM. On the other hand, the CP service may be fundamentally different from the CA service in that the CP service cannot receive input data on a host V2X communication device, for example, from a VDP or POTI unit.

The sending of the CPM includes generation and transmission of the CPM. In the generation process of the CPM, the originating V2X communication device configures a CPM, and then the CPM is delivered to the networking and transport layer for dissemination. In this disclosure, the originating V2X communication device may be referred to as a sending V2X communication device, a transmitting V2X communication device, a host V2X communication device, and the like.

On the other hand, in order to collect relevant information for CPM generation and to deliver the received CPM content for additional processing, the CP service may interface with other entities in the facilities layer and V2X applications in the facilities layer. In an embodiment, at the V2X communication device, the entity for data collection may be a facility that provides object detection at a host object detector.

Also, in order to disseminate (or send) the CPM, the CP service may use services provided by protocol entities of the transport layer and the networking. For example, the CP service may interface with the network and the transport layer (N&T) through NF-SAP to exchange CPM messages with other V2X communication devices. Also, the CP service may interface with the secure entities through SF-SAP to access the security service for CPM dissemination and CPM reception, may interface with the management entities through MF-SAP, and may interface with the application layer through FA-SAP if the received CPM data are directly provided to the application.

The dissemination of the CPM may vary according to the applied communication system. For example, in the ITS-G5 network (defined in ETSI EN 302 663), the CPM may be transmitted to all V2X communication devices within the direct communication range by the originating V2X communication device. The communication range may be particularly affected by the originating V2X communication device by changing the transmission power according to a relevant region.

Also, the CPM may be periodically generated at a rate controlled by the CP service in the originating V2X communication device. The generation frequency may be determined in consideration of a radio channel load determined by the Decentralized Congestion Control (DCC), and may be determined in consideration of the state of the detected non-ITS object, for example, dynamic behavior of position, velocity or direction, and transmission of the CPM for the same (perceived) object by other V2X communication devices.

Also, when the receiving V2X communication device receives the CPM, the CP service enables the contents of the CP to be used in facilities inside the receiving V2X communication device, such as an ITS application and/or a Local Dynamic Map (LDM). For example, the Local Dynamic Map (LDM) may be updated with the received CPM data. The V2X application may retrieve this information from the LDM for additional processing.

FIG. 4 is a view illustrating a function blocks of a CP service according to an embodiment of the disclosure. Specifically, FIG. 4 illustrates functional blocks of the CP service according to an embodiment and functional blocks having interfaces for other facilities and layers.

As shown in FIG. 4, the CP service may provide the following subfunctions for CPM transmission and reception.

CPM encoding: This subfunction may configure or generate a CPM according to a predefined format. In this case, the latest in-vehicle data may be included in the CPM.

CPM decoding: This subfunction may decode the received CPM.

CPM transmission management: This subfunction may implement the protocol operation of the originating V2X communication device. In particular, this may include activation and termination of the CPM transmission operation, determination of the CPM generation frequency, and trigger of the CPM generation.

CP reception management: This subfunction may implement the protocol operation of the receiving V2X communication device. In particular, this may include trigger of "CPM decoding" function in the CPM reception, provision of the received CPM data to the LDM or the V2X application of the receiving V2X communication device, and checking of the information of the optionally received CPM.

Hereinafter, the CPM dissemination will be described in detail. Specifically, the requirements for CPM dissemination, CP service activation and termination, CPM trigger conditions, CPM generation cycle, and constraints are described.

In an embodiment, point-to-multipoint communication may be used for CPM transmission. For example, when ITS-G5 is used for CPM dissemination, a control channel (G5-CCH) may be used. In an embodiment, the CPM generation may be triggered and managed by the CP service while the CP service is being activated. For example, the CP service may be activated together with V2X communication device activation, and may be terminated when the V2X communication device is terminated.

In an embodiment, the host V2X communication device may send a CPM whenever at least one object having a sufficient level of confidence that needs to be exchanged with the surrounding V2X communication device is detected. In regard to the inclusion of the detected object, the CP service needs to consider a trade-off between the object age and the channel utilization. For example, in terms of an application using information received by the CPM, updated information needs to be provided as frequently as possible. However, in terms of the ITS-G5 stack, the channel utilization needs to be minimized, and thus a low transmission period is required. Accordingly, in consideration of this, the V2X communication device needs to appropriately include the detected object or object information in the CPM. On the other hand, in order to reduce the resulting message size, the object needs to be evaluated before transmission thereof.

FIG. 5 is a view illustrating a CPM structure according to an embodiment of the disclosure. In the embodiment of FIG. 5, the CPM structure may be a basic CPM structure. The CPM structure of FIG. 5 may be referred to as a first CPM structure or a first type CPM structure. The CPM having the CPM structure of FIG. 5 may be referred to as a basic CPM or a first type CPM.

As described above, the CPM may be a message exchanged between V2X communication devices in a V2X network, and may be used to generate collective perception for road users and/or other objects detected and/or recognized by the V2X communication device. That is, the CPM may be an V2X message for generating a collective perception for an object detected by the V2X communication device.

In an embodiment, the CPM may include state and attribute information of road users and objects detected by the originating V2X communication device. The content may vary according to the types of detected road users or objects and the detection performance of the originating V2X communication device. For example, in the case of a vehicle object, the state information may include at least information on the actual time, position, and motion state. Also, the attribute information may include attributes such as dimension, vehicle type, and role within road traffic.

This CPM may complement the CAM, and may act similarly to the CAM. That is, the CPM may be for increasing the cooperative awareness. The CPM may include externally observable information about the detected road user or object. On the other hand, the CP service may include a method of reducing replication or duplication of the CPMs sent by different V2X communication devices by checking the CPMs sent by the other stations.

Upon CPM reception, the receiving V2X communication device may recognize the presence, type and state of the road user or object detected by the originating V2X communication device. The received information may be used by the receiving V2X communication device to support ITS applications for increasing safety and improving traffic efficiency and travel time. For example, by comparing the received information with the state of the detected road user or object, the receiving V2X communication device may estimate the risk of collision with the road user or object. Also, the receiving V2X communication device may inform a user through a Human-Machine Interface (HMI) of the receiving V2X communication device, or may automatically take corrective actions.

Hereinafter, the basic structure/format of the CPM will be described with reference to FIG. 5. This CPM format may be presented or encoding/decoding as ASN.1. Also, Data Element (DE) and Data Frame (DF), which are not defined herein, may be derived from the common data dictionary, for example, specified in ETSI TS 102 894-2.

Referring to FIG. 5, the CPM may include an ITS Protocol Data Unit (PDU) header and a plurality of containers.

The ITS PDU header is a common header including information on the protocol version, the message type, and the ITS ID of the originating V2X communication device. This ITS PDU is a common header used in the V2X message/ITS message, and exists at the starting part of the V2X message. ITS PDU header may be referred to common header, header, header part, etc.

The plurality of containers may include an Originating Vehicle Container (OVC), a Perceived (or detected) Object Container (POC), and/or a Field-of-View Container (FVC or FoVC). For example, the CPM may include an OVC as a mandatory container, and may optionally include an FVC and a POC. Hereinafter, each container will be described with reference to Tables 1 to 3.

Table 1 shows an exemplary OVC in the CPM.

TABLE 1

| DE | TS 102 894-2 [2] CDD reference |
|---|---|
| Generation Delta Time | See CAM ETSI EN 302 637-2 [3] |
| Reference Position | A.124 |
| Heading | A.112 |
| Longitudinal Speed | A.126 |
| Lateral Speed | A.126 |
| Vehicle Length | A.131 |
| Vehicle Width | A.95 |

Specifically, Table 1 shows the Data Elements (DE) and/or Data Frames (DF) included in the exemplary OVC. Here, the DE is a data type that includes single data. The DF is a data type that includes one or more elements in a predefined order. For example, the DF may be a data type that includes one or more DEs and/or one or more DFs in a predefined order.

The DE/DF may be used to configure a facility layer message or an application layer message. Examples of the facility layer messages may include CAM, CPM, DENM, and the like. In this disclosure, these messages may be referred to as V2X messages or ITS message.

As shown in Table 1, the OVC include basic information related to the V2X communication device that disseminates the CPM. The OVC may be interpreted as a scale-down version of the CAM, but may include only the DE required for a coordination transformation process. That is, although similar to the CAM, the OVC provides basic information about the originating V2X communication device. However, the included information is focused on supporting of the coordinate transformation process.

The OVC may provide the followings.

The latest geographic position of the originating V2X communication device obtained by the CP service at the time of CPM generation.

The lateral and longitudinal absolute velocity components of the originating V2X communication device.

Geometric dimensions of the originating V2X communication device.

Hereinafter, each piece of information (DE or DF) will be described with reference to Table 1.

Generation delta time (or Generation time): as DE, indicates a time corresponding to the time of the reference position in the CPM. This may be considered as the time of CPM generation. In this disclosure, the generation delta time may also be referred to as a generation time.

Reference position: as DF, indicates the geographic position of the V2X communication device. This indicates a geographic point position. In an embodiment, the reference position may include information about latitude, longitude, position reliability and/or altitude. Here, the latitude represents the latitude of the geographic point, and the longitude represents the longitude of the geographic point. Also, the position confidence represents the accuracy of the geographic position, and the altitude represents the altitude and altitude accuracy of the geographic point.

Direction: as DF, indicates the direction in the coordinate system. In an embodiment, the direction includes information about direction values and/or direction reliability/confidence. Here, the direction value indicates the traveling direction based on the north, and the direction confidence indicates the accuracy of the reported direction value having a predefined confidence level.

Longitudinal velocity: as DF, longitudinal velocity and the accuracy of velocity information with respect to a moving object (e.g., a vehicle) may be described. In an embodiment, the longitudinal velocity includes information on velocity values and/or velocity accuracy. Here, the velocity value indicates the velocity value in the longitudinal direction, and the velocity accuracy indicates the accuracy of the reported velocity value.

Lateral velocity: as DF, lateral velocity and the accuracy of velocity information with respect to a moving object (e.g., a vehicle) may be described. In an embodiment, the lateral velocity includes information on velocity values and/or velocity accuracy. Here, the velocity value indicates the velocity value in the lateral direction, and the velocity accuracy indicates the accuracy of the reported velocity value.

Vehicle length: as DF, indicates vehicle length and accuracy indication. In an embodiment, the vehicle length includes information about a vehicle length value and/or a vehicle length accuracy indication. Here, the vehicle length indicates the length of the vehicle, and the vehicle length accuracy indication indicates an indication of the reported length value confidence.

Vehicle width: as DE, indicates the width of the vehicle. For example, the vehicle width may indicate the width of the vehicle, including the side mirrors. For example, when the vehicle width is equal to or greater than about 6.1 meters, the value needs to be set to 61. When this information is not available, the value needs to be set to 62.

Table 2 shows an exemplary FVC in the CPM.

TABLE 2

| DE | Si-Unit | Description |
| --- | --- | --- |
| Sensor ID | — | Unique ID of sensor which is used to identify by which sensor an object has been perceived. The ID is a random number generated when the V2X device is activated and never changes until the V2X device is deactivated. |
| Sensor Type | — | Enumeration of sensor types: undefined (0), radar (1), lidar (2), monovideo (3), stereovision (4), nightvision (5), ultrasonic (6), fusedObject (7), pmd(8) |
| Sensor Position | | |
| Position X | m | Mounting position of the sensor in negative x-direction according to the ISO 8855 [i.15] reference frame, measured from the ETSI reference position (see Clause B.19 in EN 302 637-2 [3]) |
| Position Y | m | Mounting position of the sensor in y-direction according to the ISO 8855 [i.15] reference frame, measured from the ETSI reference position (see Clause B.19 in EN 302 637-2 [3]) |
| Radius | m | Average perception range of the sensor as defined by the manufacturer |
| Opening Angle | | |
| Begin Angle | deg | Start angle of the sensor frustum in ISO 8855 [i.15] coordinate system |
| End Angle | deg | End angle of the sensor frustum in ISO 8855 [i.15] coordinate system |
| Quality Class | — | Classification of sensor defining the quality of measured objects |

The FVC provides a description/information of at least one sensor mounted onto the originating V2X communication device. When the V2X communication device is equipped with multiple sensors, the description may be added several times. For example, the FVC provides information about the sensor capabilities of the originating V2X communication device. To this end, the generic sensor characteristics which provide the mounting position of a sensor on the disseminating V2X communication device as well as the type of sensor and the range and opening angle of the sensor (i.e., the frustum of the sensor) may be included as a part of the message. This information may be used by the receiving V2X communication device to select an appropriate prediction model according to the performance of the sensor.

Hereinafter, each piece of information (DE or DF) will be described with reference to Table 2.

Sensor ID: This indicates a unique ID of a sensor used to identify the sensor where an object is perceived (or detected). For example, the sensor ID indicates the unique ID of the sensor that detects the object. In an embodiment, the sensor ID may be a random number generated when the V2X communication device is activated, and may not be changed until the V2X communication device is deactivated.

Sensor type: This indicates the type of sensor. That is, the sensor type is enumerated. For example, the sensor type may be undefined (0), radar (1), lidar (2), monovideo (3), stereovision (4), nightvision (5), ultrasonic (6), fusedObject (7) or pmd (8).

Sensor position: Position X indicates the mounting position of the sensor in the negative x-direction, and position Y indicates the mounting position of the sensor in the y-direction.

Radius: This indicates the average recognition range of a sensor as defined by a manufacturer.

Opening angle and End angle: The opening angle indicates the start angle of the sensor frustum, and the end angle indicates the end angle of the sensor frustum.

Quality Class: This indicates classification of the sensors that define the quality of the measured objects.

Table 3 shows an exemplary POC in the CPM.

TABLE 3

| DE | TS 102 894-2 [2] CDD reference | Mandatory | Description |
| --- | --- | --- | --- |
| Time of Measurement | | Yes | Time in micro-seconds from the message reference time. Defines the relative age of the measured object. |
| Object ID | | Yes | Unique random ID assigned to object. This ID is maintained (i.e. does not change) as long as the object is tracked (i.e. considered by the disseminating ITS-S's data fusion processes). |
| Sensor ID | | Yes | Corresponds to the Sensor ID DE in Table 4. This DE is used to relate the object information to the sensor providing the measurement. |

TABLE 3-continued

| DE | TS 102 894-2 [2] CDD reference | Mandatory | Description |
| --- | --- | --- | --- |
| Longitudinal Distance | | Yes | |
| Distance Value | | Yes | Relative x-distance to object in originator reference frame ISO 8855 [i.15] |
| Distance Confidence | | Yes | Confidence of relative x-distance to object in originator reference frame ISO 8855 [i.15] |
| Lateral Distance | | Yes | |
| Distance Value | | Yes | Relative y-distance to object in originator reference frame ISO 8855 [i.15] |
| Distance Confidence | | Yes | Confidence of relative y-distance to object in originator reference frame ISO 8855 [i.15] |
| Longitudinal Speed | A.126 | Yes | Longitudinal speed of detected object along with confidence as described in CDD |
| Lateral Speed | A.126 | Yes | Lateral speed of detected object along with confidence as described in CDD |
| Object Heading | A.112 | No | Absolute orientation of object in WGS84 reference frame, if provided by data fusion process |
| Object Length | | No | |
| Length Value | | No | Measured length of the object |
| Length Confidence | | No | Confidence of measured length of the object |
| Object Width | | No | |
| Width Value | | No | Measured width of the object |
| Width Confidence | | No | Confidence of measured width of the object |
| Object Type | A.78 | No | Classification of object, if provided by data fusion process |

The POC is used to describe the object perceived by the sensor in terms of the transmitting V2X communication device. Upon POC reception, the receiving V2X communication device may perform the coordinate transformation process with the help of the OVC to convert the position of the object into the reference frame of the reception vehicle. In order to reduce the message size, several optional DEs may be provided, which may be used when the originating V2X communication device may provide this DE.

The POC may be configured with selection of DEs to provide an abstract description of the perceived (or detected) object. For example, relative distance and velocity information and timing information about the perceived (or detected) object related to the originating V2X communication device may be included in the POC as a mandatory DE. In addition, when the sensor of the originating V2X communication device can provide the requested data, additional optional DEs may be provided.

Hereinafter, each piece of information (DE or DF) will be described with reference to Table 3.

Measurement time: This indicates a time of microsecond unit from the message reference time. This may define the relative lifetime of the measured object.

Object ID: This indicates a unique random ID assigned to an object. This ID is maintained (i.e., is not changed) as long as the object tracks (i.e., as long as being considered by a data fusion process of the disseminating V2X communication device).

Sensor ID: This is an ID corresponding to the sensor ID DE in Table 2. This DE may be used to correlate object information with a sensor that provides measurement.

Longitudinal distance and Distance confidence for longitudinal distance: The distance value indicates a relative distance x to the object in the originator reference frame, and the distance confidence indicates the confidence of a relative distance x to the object in the originator reference frame.

Lateral distance and Distance confidence for lateral distance: The distance value indicates a relative distance x to the object in the originator reference frame, and the distance confidence indicates the confidence of a relative distance x to the object in the originator reference frame.

Longitudinal speed: This indicates the longitudinal velocity of the detected object according to the confidence.

Lateral speed: This indicates the lateral velocity of the detected object according to the confidence.

Object direction: When provided by the data fusion process, in the reference frame, this indicates the absolute direction of the object.

Object length and Length confidence for object length: The length value indicates the measured length of the object, and the length confidence indicates the confidence of the measured length of the object.

Object width and Width confidence for object width: The width value indicates the measured width of the object, and the width confidence indicates the confidence of the measured width of the object.

Object type: This indicates the classification of the object, when provided by the data fusion process.

FIG. 6 is a view illustrating a method of extracting sensor data by a V2X communication device providing a CP service according to an exemplary embodiment of the disclosure. Specifically, FIG. 6A shows how the V2X communication device extracts sensor data at a low level, and FIG. 6B shows how the V2X communication device extracts sensor data at a high level.

The source of the sensor data to be transmitted as a part of any CPM need to be selected according to the requirements of the prospective data fusion process on the receiving V2X communication device. Generally, the transmitted data need to be as close as possible to the original sensor data. However, simple transmitting of the original sensor data, for example, raw data is not a viable solution. This is because the transmitting of the original sensor data imposes very high requirements in regard to the data rate and transmission period. FIGS. 6A and 6B show possible implementations for selecting data to be transmitted as a part of the CPM.

In the embodiment of FIG. 6A, sensor data are obtained from different sensors, and are processed as a part of a low-level data management entity. This entity may not only select the object data to be inserted as a part of the next CPM, but also calculate the plausibility of the detected object. In the case of FIG. 6A, since the data of each sensor are transmitted, the amount of data transmitted through the V2X network is increased, but the sensor information may be efficiently used at the receiving V2X communication device.

In the embodiment of FIG. 6B, the sensor data or the object data provided by the data fusion process specific to a V2X communication device manufacturer are transmitted as a part of the CPM. In the case of FIG. 6B, since the integrated sensor data collected into one through the data fusion block are transmitted, there is an advantage in that the amount of data transmitted through the V2X network is small. However, there is a disadvantage of being dependent on the collection method of the V2X communication device collecting the sensor information. In this case, since different data fusion processes can be implemented by different manufacturers, this implementation method is not generally preferred to FIG. 6A.

On the other hand, regardless of the implementation type, whenever the object is detected by the sensor of the V2X communication device, the plausibility thereof needs to be calculated. When the plausibility of the object exceeds a given threshold PLAUS_OBJ, the transmission needs to be considered. For example, when an absolute difference between the current yaw-angle of the detected object and the yaw angle included in the CPM previously transmitted by the originating V2X communication device exceeds about 4 degrees, when a relative distance between the current positions of the originating V2X communication device and the detected object and a relative position difference between the originating V2X communication device and the detected object included in the CPM previously transmitted by the originating V2X communication device exceeds about 4 meters, or when an absolute difference between the current velocity of the detected object and the velocity included in the CPM previously transmitted by the originating object exceeds about 0.5 m/s, the transmission may be considered.

FIG. 7 is a view illustrating a method by which a V2X communication device communicates with another V2X communication device according to an embodiment of the disclosure.

In the embodiment of FIG. 7, it is assumed that each vehicle or vehicle V2X communication device is located within a communication radius/range. For example, as shown in the drawing, the first vehicle V2X communication device of the first vehicle V1, the second vehicle V2X communication device of the second vehicle V2, and the third vehicle V2X communication device of the third vehicle V3 may be all located within the communication radiuses/ranges of each vehicle V2X communication device. Accordingly, each V2X communication device may transmit a V2X message to other V2X communication devices, or may receive a V2X message from other V2X communication devices. Here, the V2X message may be a CAM or a CPM.

On the other hand, for convenience of explanation in the following embodiments, the vehicle V2X communication device and the vehicle may be equated with each other. For example, the operation by the vehicle V2X communication device may be equated with the operation by the vehicle.

FIG. 8 illustrates a method of communicating, by the V2X communication device according to an embodiment of the disclosure, with another V2X communication device using a CPM. In the embodiment of FIG. 8, it is assumed that the structure of a CPM follows the structure of FIG. 5.

FIG. 8A illustrates a procedure of transmitting a CPM by a V2X communication device according to an embodiment of the disclosure, and FIG. 8B illustrates the structure of the CPM transmitted through the procedure of FIG. 8A. In the embodiment of FIG. 8, it is assumed that the V2X communication device is the V2X communication device of FIG. 7. Furthermore, in the embodiment of FIG. 8, it is assumed that each vehicle includes at least one sensor and can detect a surrounding object using the sensor.

Referring to FIG. 8A, first, a first vehicle V2X communication device may transmit or broadcast a first CPM. A second vehicle V2X communication device and a third vehicle V2X communication device may receive the first CPM.

The structure of the transmitted first CPM is the same as that illustrated at the top of FIG. 8B. The first CPM includes basic information (e.g., position and state information) of the first vehicle, and may also include object information for the second vehicle and the third vehicle, that is, objects detected by the sensor of the first vehicle. In this case, the basic information of the first vehicle is included in the OVC of the first CPM. The object information for the second vehicle and the third vehicle may be included in the POC of the first CPM. Accordingly, the second vehicle and the third vehicle can obtain their own information and information of another vehicle obtained by the first vehicle in addition to information of the first vehicle through the received first CPM.

Furthermore, the second vehicle V2X communication device may transmit or broadcast a second CPM. The first vehicle V2X communication device and the third vehicle V2X communication device may receive the second CPM. The structure of the transmitted second CPM is the same as that illustrated in the middle of FIG. 8(*b*). The second CPM includes basic information (e.g., position and state information) of the second vehicle, and may also include object information for the first vehicle and the third vehicle, that is, objects detected by the sensor of the second vehicle. In this case, the basic information of the second vehicle may be included in the OVC of the second CPM. The object information for the first vehicle and the third vehicle may be included in the POC of the second CPM. Accordingly, the first vehicle and the third vehicle can obtain their own information and information of another vehicle obtained by the second vehicle in addition to information of the second vehicle through the received second CPM.

Furthermore, the third vehicle V2X communication device may transmit or broadcast a third CPM. The first vehicle V2X communication device and the second vehicle V2X communication device may receive the third CPM. The structure of the transmitted third CPM is the same as that illustrated at the bottom of FIG. 8B. The third CPM includes basic information (e.g., position and state information) of the third vehicle, and may also include object information for the first vehicle and the second vehicle, that is, objects detected by the sensor of the third vehicle. In this case, the basic information of the third vehicle may be included in the OVC of the third CPM. The object information for the first vehicle and the second vehicle may be included in the POC of the third CPM. Accordingly, the first vehicle and the second vehicle can obtain their own information and information of another vehicle obtained by the third vehicle in addition to information of the third vehicle through the received third CPM.

Each vehicle can be aware of the position and state of a vehicle detected by a surrounding vehicle in addition to the position and state of the surrounding vehicle based on the transmission and reception of such a CPM, and may use the positions and states for vehicle safety, traffic efficiency, etc. Accordingly, unlike in the CAM, information on an object on which a V2X device is not mounted around a vehicle that transmits a V2X message can be obtained. Accordingly, more accurate vehicle safety and traffic efficiency service can be provided to a user.

However, an object detected by a vehicle that transmits a CPM (transmission vehicle) may be the same object as a vehicle that receives the CPM (reception vehicle). In this case, if the reception vehicle is a vehicle that generates and transmits a CPM, it redundantly transmits basic information of its own vehicle along with another (e.g., transmission vehicle).

As in the embodiment of FIG. 9, if the number of vehicles that exchange CPMs is small, the transmission of redundant information through such a CPM may not be a great problem. However, if the number of vehicles that exchange CPMs is many as in a congestion area of the downtown area, the number of objects that transmit redundant information may be increased. This may lead to an increase in the amount of information transmitted through a limited channel, making poor a communication environment. Hereinafter, a problem caused by CPM transmission using a method, such as the embodiment of FIG. 8, in a congestion environment is described with reference to FIGS. 9 to 10.

FIG. 9 illustrates a method of transmitting a CPM by the V2X communication device according to an embodiment of the disclosure in a congestion environment. In the embodiment of FIG. 9, the congestion environment may be an environment in which traffic jam has occurred in a congestion area of the downtown area, for example. In this case, many vehicles may be present in each lane, and vehicles may be positioned within 10 meters, for example. In this case, each vehicle may detect an average of 8 vehicles through the sensor of the vehicle.

If N vehicles within a communication range transmit CAMs, basic information of the vehicle is transmitted N times. The reason for this is that each vehicle transmits only basic information for its own vehicle through each CAM.

However, if N vehicles within a communication range transmit CPMs, basic information of the vehicle is even more transmitted than N times. The reason for this is that each vehicle transmits information for a surrounding vehicle detected by the sensor of each vehicle in addition to basic information for its own vehicle through a CPM.

If the number of vehicles within a communication range is so many as in the congestion situation of FIG. 9, the number of surrounding vehicles detected by vehicles is much increased. In this case, if a CPM transmission method, such as that of FIG. 8 using the CPM structure of FIG. 5, is used, the size of a CPM generated by a transmission vehicle (e.g., HV1) is very increased. Furthermore, the amount of vehicle information that is redundantly transmitted is increased. Accordingly, a communication environment may become poor because the amount of information transmitted through a limited channel is increased. Accordingly, a new method of a CPM generation method and a new form of a CPM structure may be necessary so that a V2X communication device can provide an efficient CP service.

FIG. 10 illustrates the state of a communication channel when the CPM structure of FIG. 5 is used.

If a V2X communication device uses the CPM structure of FIG. 5, the size of a CPM is increased in a congestion situation, such as FIG. 9. For example, as illustrated in FIG. 10, the probability that a collision may occur between packets in an environment having a high CBR is increased due to an increase in the size of a transmission packet (or transmission frame) including a CPM. Furthermore, communication performance is deteriorated because back-off attributable to the collision is increased.

FIG. 11 illustrates a method of classifying the type of data of a CPM according to an embodiment of the disclosure. In the embodiment of FIG. 11, the CPM may have the basic CPM structure described in FIG. 5.

Referring to FIG. 11, the CPM may include an OVC container, an FoVC container and/or a POC container. In this case, the OVC container may include dynamic and static data. The FoVC container may include static data. The POC container may include dynamic data.

In this case, the dynamic data/information means data/information changed whenever the CPM is transmitted. The static data/information means data/information maintained without being changed when the CPM is transmitted. That is, the dynamic data may be data having a dynamic characteristic, and the static data may be data having a static characteristic. For example, the dynamic data may be data (e.g., the position, speed, direction, etc. of a vehicle) changed every CPM transmitted by the same V2X communication device (e.g., vehicle V2X communication device). The static data may be data (e.g., the length, width, etc. of a vehicle) that maintains the same value in each CPM transmitted by the same V2X communication device (e.g., vehicle V2X communication device) or each CPM within a preset period. Such dynamic data and static data may be directly classified by a user or may be automatically classified based on the characteristics of data.

Table 4 illustrates an OVC container including dynamic and static data. The OVC container may be a container for providing state information of a vehicle that provides a CP service.

TABLE 4

| ASN.1 Representation | |
| --- | --- |
| DF_OriginatingVehicleContainer | = SEQUENCE{ |
| Generation Delta Time | -Dynamic |
| Reference Position | -Dynamic |
| Heading | -Dynamic |
| Longitudinal Speed | -Dynamic |
| Lateral Speed | -Dynamic |
| Vehicle Length | -Static |
| Vehicle Width | -Static |
| } | |

Referring to Table 4, among information included in the OVC container, generation delta time information (generation time information), reference position information, direction information, longitudinal speed information, and lateral speed information may be classified as dynamic data/information, and vehicle length information and vehicle width information may be classified as static data/information. Each of the pieces of information has been described above with reference to Table 1, and thus a detailed description thereof is omitted.

As described above, in the case of the OVC container, some of data may be classified as dynamic data which may be changed every CPM, and the remainder may be classified as static data that maintains the same value in each CPM.

Table 5 illustrates an FoVC container including static data. The FoVC container may be a container for providing information for a sensor (sensor information) used to collect object information provided through a CP service. The FoVC container may be referred to as an FVC container.

TABLE 5

```
ASN.1 Representation
DF_FieldofViewContainer      = SEQUENCE{
    SensorID                 -Static
    SensorType               -Static
    SensorPositionX          -Static
    SensorPositionY          -Static
    Radius                   -Static
    OpenningAngle            -Static
    EndAngle                 -Static
    QualityClass
}
```

Referring to Table 5, all pieces of information included in the FoVC container may be classified as static data/information. For example, information included in the FoVC container, for example, sensor ID information, sensor type information, sensor position information, radius information, open angle information, end angle, quality class information, etc. may be classified as static data that maintains the same value in each CPM. Each of the pieces of information has been described above with reference to Table 2, and thus a detailed description thereof is omitted.

Table 6 illustrates a POC container including dynamic data. The POC container may be a container for providing information for an object (object information) provided through a CP service.

TABLE 6

```
ASN.1 Representation
DF_Perceived ObjectContainer    = SEQUENCE{
    TimeOfMeasurement           TimeOfMeasurement    -Dynamic
    ObjectID                    DE_ObjectID          -Dynamic
    SensorID                    DE_SensorID          -Dynamic
    LongitudinalDistanceValue       refer to ISO 8855    -Dynamic
    LongitudinalDistanceConfidence   refer to ISO 8855    -Dynamic
    LateralDistanceValue            refer to ISO 8855    -Dynamic
    LateralDistanceConfidence       refer to ISO 8855    -Dynamic
    LongitudinalSpeed           reference from CDD   -Dynamic
    LateralSpeed                reference from CDD   -Dynamic
    ObjectHeading               reference from CDD   -Dynamic
    ObjectLengthValue           DE_Length            -Static
    ObjectLengthConfidence      DE_Confidence        -Static
    ObjectWidthValue            DE_Length            -Static
    ObjectWidthConfidence       DE_Confidence        -Static
    ObjectType                  DE_ObjectType        -Static
    LaneNumber                                       -Dynamic
    ActionID                                         -Dynamic
    DetectTime                                       -Dynamic
    EventType                                        -Dynamic
}
```

Referring to Table 6, among information included in the POC container, measurement time information, object ID information, sensor ID information, longitudinal distance information and distance confidence information therefor, lateral distance information and distance confidence information therefor, longitudinal speed information, lateral speed information, and object direction information may be classified as dynamic data which may be changed every CPM. However, among the information included in the POC container, object length information and length confidence information, object width information and width confidence information, and object type information may be classified as static data that maintains the same value in each CPM. Each of the pieces of information has been described above with reference to Table 3, and thus a detailed description thereof is omitted.

As described above, a CPM message for a CP service may include dynamic data that provides information of a type which may be changed whenever the message is transmitted and/or static data that provides information of a type which is maintained without being changed when the message is transmitted. In this case, the static data may be a value indicating basic characteristics that are not changed, such as the size of a vehicle and a position to which a sensor is attached, for example. In contrast, the dynamic data may be information for an object measured through the speed, position or sensor of a vehicle and information that is actually wanted to be transmitted through a CPM message, for example.

However, if data for a CP service is transmitted using the CPM message structure of FIG. 5, static data and dynamic data area transmitted in the same frequency. In this case, data not having a change of information is transmitted in the same frequency as data having a lot of change in information. Accordingly, communication efficiency is deteriorated because a channel busy ratio (CBR) is increased due to the continued transmission of redundant information.

For example, if the CPM message structure of FIG. 5 is transmitted, a transmission V2X communication device continues to transmit the same static data whenever it transmits a CPM message. A reception V2X communication device continues to receive the same static data as static data, included in a first received CPM message, whenever it receives a CPM. Accordingly, communication efficiency is deteriorated because a CBR is increased due to the continued transmission of redundant information.

Accordingly, in order to improve communication efficiency, a CPM message having a new structure different from the CPM message structure of FIG. 5 needs to be considered. In a CPM message having the new structure, the type of data (e.g., static data or dynamic data) included in the CPM message may have been taken into consideration. Hereinafter, a new structure of a CPM message and a method of operating the new structure are described with reference to the drawings.

FIG. 12 illustrates the structure of a first type of a CPM message according to an embodiment of the disclosure. The first type CPM message may be referred to as a first type static/dynamic message.

Referring to FIG. 12, the first type CPM message may include an ITS PDU header, a static container and/or a dynamic container. The static container may be a container for transmitting data having a static characteristic (static data). The dynamic container may be a container for transmitting data having a dynamic characteristic (dynamic data). Accordingly, the static data classified in FIG. 11 may be included in the static container, and the dynamic data may be included in the dynamic container.

For example, as illustrated in FIG. 12, the static data of the OVC container and the static data of the FoVC container may be included in the static container. The dynamic data of the OVC container and the dynamic data of the POC container may be included in the dynamic container. Meanwhile, in the case of the first type CPM message, the static data of the POC container may be included in the dynamic container along with the dynamic data of the POC container. As described above, in the case of the first type CPM message, information on the length, width, type, etc. of an object included in the POC container is information having a static characteristic, but may be included in the dynamic container so that the information can be processed along with the information having the dynamic characteristic included in the POC container. Accordingly, processing efficiency of information included in a POC container having a high proportion of dynamic data can be increased.

Hereinafter, the first type CPM message is specifically described with reference to Table 7 to Table 9.

As described above, a static container may include the static data of an OVC container and the data of an FoVC container. The static data of the OVC container may be referred to as static OVC data, and the data of the FoVC container may be referred to as FoVC data.

Table 7 illustrates static OVC data included in a static container. The static OVC data may be configured as a data frame (DF) in a sequence form.

TABLE 7

| ASN.1 Representation | |
|---|---|
| DF_StaticOriginatingVehicleContainer | = SEQUENCE{ |

TABLE 7-continued

| | |
|---|---|
| Vehicle Length | -Static |
| Vehicle Width | -Static |
| Vehicle Height | -Static |
| Vehicle Type | -Static |
| VehicleRole | -Static |
| } | |

Referring to Table 7, the static OVC data may include vehicle length information, vehicle width information, vehicle height information, vehicle type information and/or vehicle role information, which have been classified as static data in the OVC container. The vehicle length information and the vehicle width information have been described in Table 1, and thus a detailed description thereof is omitted.

As in Table 7, the static OVC data may further include the vehicle height information, vehicle type information and/or vehicle role information classified as static data, and a description thereof is as follows.

The vehicle height information may indicate the height of a vehicle. For example, the vehicle height information may indicate the height of a vehicle in a 10 cm unit. Table 8 illustrates an illustrative ASN.1 representation of the vehicle height information.

TABLE 8

| |
|---|
| ASN.1 Representation : DE_Vehicle Height |
| Vehicle Height ::= INTEGER  tenCentimeters(1), outOfRagne(1022), Unavailable(1023)} (1..1023) |

Referring to Table 8, the vehicle height information is a DE, and may be an integer from 1 to 1023 indicative of the height of a vehicle. In this case, the vehicle height information may be indicated in a 10 cm unit. Furthermore, if a preset range is exceeded (outOfRange), a value of the vehicle height information may be set to 1022. Alternatively, if the vehicle height information cannot be used (Unavailable), a value of the vehicle height information may be set to 1023.

The vehicle type information may indicate the type of vehicle. For example, the vehicle type information may indicate the type of vehicle, such as a motorcycle, a car or a bus. Table 9 illustrates an illustrative ASN.1 representation of the vehicle type information.

TABLE 9

| |
|---|
| ASN.1 Representation : DE_StationType |
| StationType ::= INTEGER {unknown(0), pedestrian(1), cyclist(2), moped(3), motorcycle(4), passengerCar(5), bus(6), lightTruck(7), heavyTruck(8), trailer(9), specialVehicles(10), tram(11), roadSideUnit(15)} (0..255) |

Referring to Table 9, the vehicle type information is a DE, and may be an integer from 0 to 255 indicating the type of vehicle. For example, when the vehicle type information is 0, the vehicle type information may indicate that a vehicle is an unknown vehicle. Alternatively, when the vehicle type information is 4, the vehicle type information may indicate that a vehicle is a motorcycle. Through such a method, the vehicle type information may be set as a predefined value indicative of the type of vehicle. The vehicle type information may be referred to as station type information.

The vehicle role information may indicate the role of a vehicle that transmits a CPM message. For example, the vehicle role information may indicate the role of a vehicle, such as a public transport vehicle, a special transport vehicle, or an emergency vehicle. Table 10 illustrates an illustrative ASN.1 representation of the vehicle role information.

TABLE 10

ASN.1 Representation : DE_VehicleRole

VehicleRole ::= ENUMERATED {default(0), publicTransport(1), specialTransport(2), dangerousGoods(3), roadWork(4), rescue(5), emergency(6), safetyCar(7), agriculture(8), commercial(9), military(10), roadOperator(11), taxi(12), reserved1(13), reserved2(14), reserved3(15)}

Referring to Table 10, the vehicle role information is a DE, and may be list type data indicating the role of a vehicle. For example, when the vehicle role information is 1, the vehicle role information may indicate that a corresponding vehicle is a vehicle that performs the role of public transport. Alternatively, when the vehicle role information is 6, the vehicle role information may indicate that a corresponding vehicle is a vehicle that performs the role of an emergency vehicle. Through such a method, the vehicle type information may be set as predefined list type data indicating the role of a vehicle.

Meanwhile, FoVC data included in the static container has been described in Table 5, and thus a detailed description thereof is omitted.

As described above, the dynamic container may include the dynamic data of an OVC container and the data of a POC container. The dynamic data of the OVC container may be referred to as dynamic OVC data, and the data of the POC container may be referred to as POC data.

Table 11 illustrates dynamic OVC data included in a dynamic container. The dynamic OVC data is a data frame (DF), and may be configured in a sequence form.

TABLE 11

| ASN.1 Representation | |
|---|---|
| DF_DynamicOriginatingVehicleContainer | ::= SEQUENCE { |
| Generation Delta Time | - Dynamic |
| Reference Position | - Dynamic |
| Heading | - Dynamic |
| Longitudinal Speed | - Dynamic |
| Lateral Speed | - Dynamic |
| Z-Speed | - Dynamic |
| LongitudinalAcceleration | - Dynamic |
| LateralAcceleration | - Dynamic |
| LaneNumber | - Dynamic |
| PathHistory | - Dynamic |
| } | |

Referring to Table 11, the dynamic OVC data may include generation time information, reference position information, direction information, longitudinal speed information, lateral speed information, Z-speed information, acceleration information, lane information and/or path history (pathHistory) information, which are classified as dynamic data in the OVC container. The generation time information, reference position information, direction information, longitudinal speed information, and lateral speed information have been described in Table 1, and thus a detailed description thereof is omitted.

As in Table 11, the dynamic OVC data may further include Z-speed information, acceleration information, lane information and/or path history information which are classified as dynamic data, and a description thereof is as follows.

The Z-speed information may indicate the speed of a vehicle in a Z-axis direction. For example, the Z-speed information may indicate the Z-axis direction speed of a vehicle in a 1 millimeter unit per hour. Table 12 illustrates an illustrative ASN.1 representation of the Z-speed information.

TABLE 12

ASN.1 Representation : DE_ZSpeedValue

ZSpeedValue ::= INTEGER {standstill(0), oneCentimeterPerSec(1),unavailable(2048)} (−2047..2048)

Referring to Table 12, the Z-speed information is a DE, and may be an integer from −2027 to 2048 indicating the speed of the Z-axis direction in a 1 cm/s unit. For example, when the Z-speed information is 0, the Z-speed information may indicate that a vehicle is a stop state. Alternatively, when the Z-speed information is 1 to 2047, the Z-speed information may indicate that the Z-axis direction speed of a vehicle is 1 to 2047 cm/s in an upward direction. Alternatively, when the Z-speed information is −1 to −2047, the Z-speed information may indicate that the −axis direction speed of a vehicle is 1 to 2047 cm/s in a downward direction. Alternatively, if the Z-speed information cannot be used (Unavailable), a value of the Z-speed information may be set to 2048. The Z-speed information may be referred to as Z-speed value information.

The acceleration information may indicate the acceleration of a vehicle. In one embodiment, the acceleration information may include longitudinal acceleration information and/or lateral acceleration information. The longitudinal acceleration information may indicate the acceleration of a vehicle in a longitudinal direction. For example, longitudinal acceleration information may indicate the acceleration of a vehicle in the longitudinal direction in a 0.1 $m/s^2$ unit. The lateral acceleration information may indicate the acceleration of a vehicle in the lateral direction. For example, lateral acceleration information may indicate the acceleration of a vehicle in the lateral direction in a 0.1 m/s² unit. Table 13 illustrates an illustrative ASN.1 representation of the acceleration information.

TABLE 13

ASN.1 Representation : DE_AccelerationValue
AccelerationValue ::= INTEGER {pointOneMeterPerSecSquaredUp(1), pointOneMeterPerSecSquaredDown(−1), unavailable(161)} (−160 .. 161)

Referring to Table 13, the acceleration information is a DE, and may be an integer from −160 to 161 indicating the longitudinal acceleration or lateral acceleration of a vehicle depending on setting. For example, when the acceleration information is 0, the acceleration information may indicate that the acceleration of a vehicle is 0. Alternatively, when the acceleration information is 1 to 160, the acceleration information may indicate the acceleration of a vehicle is 1 to 16 m/s². That is, the acceleration information may indicate that the vehicle is accelerating. Alternatively, when the acceleration information is −1 to −160, the acceleration information may indicate that the acceleration of a vehicle −1 to −16 m/s². That is, the acceleration information may indicate that the vehicle is decelerating. Alternatively, if the acceleration information cannot be used (Unavailable), a value of the acceleration information may be set to 161. The acceleration information may be referred to as acceleration value information.

The lane information may indicate the number of a lane where a vehicle is positioned. For example, the lane information may indicate the number of a lane where a vehicle is positioned in such a way to increase by 1 from an outside lane or may indicate the number of a lane where a vehicle is positioned in such a way to increase by 1 from an inside lane. Table 14 illustrates an illustrative ASN.1 representation of a lane information.

TABLE 14

ASN.1 Representation : DE_LanePosition
LanePosition ::= INTEGER {offTheRoad(−1), hardShoulder(0),outermostDrivingLane(1), secondLaneFromOutside(2)} (−1..14)

Referring to Table 14, the lane information is a DE, and may be an integer from −1 to 14 indicating the position or number of a lane. For example, when the lane information is −1, the lane information may indicate that a lane is an off road (offTheRoad). Alternatively, when the lane information is 0, the lane information may indicate that a lane is a hard shoulder (hardShoulder). Alternatively, when the lane information is 1 to 14, the lane information may indicate that a lane is 1 to 14 lane or 14 to 1 lane. In this case, the number of a lane may be increased by 1 from an outside lane or an inside lane based on a value of the lane information. Accordingly, a maximum of 14 lane representations are possible. The lane information may be referred to as lane position information.

The path history information may provide notification of a route along which a vehicle providing a CP service has traveled. Table 15 illustrates an illustrative ASN.1 representation of path history information.

TABLE 15

ASN.1 Representation : DF_PathHistory
PathHistory::= SEQUENCE (SIZE(0..40)) OF DeltaReferencePosition
DeltaReferencePosition ::= SEQUENCE {deltaLatitude DeltaLatitude, deltaLongitude DeltaLongitude, deltaAltitude DeltaAltitude } DeltaLongitude ::= INTEGER {oneMicrodegreeEast (10), oneMicrodegreeWest (−10), unavailable(131072)} (− 131071..131072) DeltaLatitude ::= INTEGER {oneMicrodegreeNorth (10), oneMicrodegreeSouth (−10) ,unavailable(131072)} (−131071..131072) DeltaAltitude ::= INTEGER {oneCentimeterUp (1), oneCentimeterDown (−1), unavailable(12800)} (− 12700..12800)

Referring to Table 15, the path history information is a DF and may be a sequence of reference position information. The reference position information may be referred to as delta reference position information. Each of pieces of reference position information may include longitude information, latitude information and/or altitude information.

The longitude information may indicate the longitude of a corresponding position. In one embodiment, the longitude information may indicate an offset position value of longitude. For example, the longitude information may be a value from −131071 to 130172 indicating longitude in a 1 micro angle unit. A positive number may indicate that the longitude information has a longitude value in an eastward direction compared to reference longitude. A negative number may indicate that the longitude information has a longitude value in a westward direction compared to reference longitude. The longitude information may be referred to as delta longitude information.

The latitude information may indicate the latitude of a corresponding position. In one embodiment, the latitude information may indicate an offset position value of latitude. For example, the latitude information may be a value from −131071 to 130172 indicating latitude in a 1 micro angle unit. A positive number may indicate that the latitude information has a latitude value in a northward direction compared to reference latitude. A negative number may indicate that the latitude information has a latitude value in a southward direction compared to reference latitude. The latitude information may be referred to as delta latitude information.

The altitude information may indicate the altitude of a corresponding position. In one embodiment, the altitude information may indicate an offset position value of altitude. For example, the altitude information may be a value from −12700 to 12800 indicating altitude in a 1 cm unit. A positive number may indicate that the altitude information has an altitude value above a reference surface (e.g., a sea level). A negative number may indicate that the altitude information has an altitude value below the reference surface. The altitude information may be referred to as delta altitude information.

Table 16 indicates POC data included in a dynamic container. The POC data is a data frame and may be configured in a sequence form. As described above, in the case of the first type CPM message, POC data included in the dynamic container includes the static data of a POC container in addition to the dynamic data of the POC container.

TABLE 16

```
ASN.1 Representation
DF_PerceivedObjectContainer      ::= SEQUENCE {
    TimeOfMeasurement               TimeOfMeasurement     - Dynamic
    ObjectID                        DE_ObjectID           - Dynamic
    SensorID                        DE_SensorID           - Dynamic
    LongitudinalDistanceValue       refer to ISO 8855     - Dynamic
    LongitudinalDistanceConfidence  refer to ISO 8855     - Dynamic
    LateralDistanceValue            refer to ISO 8855     - Dynamic
    LateralDistanceConfidence       refer to ISO 8855     - Dynamic
    LongitudinalSpeed               reference from CDD    - Dynamic
    LateralSpeed                    reference from CDD    - Dynamic
    ObjectHeading                   reference from CDD    - Dynamic
    ObjectLengthValue               DE_Length             - Static
    ObjectLengthConfidence          DE_Confidence         - Static
    ObjectWidthValue                DE_Length             - Static
    ObjectWidthConfidence           DE_Confidence         - Static
    ObjectType                      DE_ObjectType         - Static
    LaneNumber                                            - Dynamic
    ActionID                                              - Dynamic
    DetectionTime                                         - Dynamic
    EventType                                             - Dynamic
}
```

Referring to Table 16, the POC data may include measurement time information, object ID information, sensor ID information, distance information and confidence information for the distance information, speed information, object direction information, object length information and confidence information for the length information, object width information and confidence information for the width information, object type information, lane information, action ID information, detection time information and/or event type information, which are classified as dynamic data and static data. The measurement time information, object ID information, sensor ID information, distance information and confidence information for the distance information, speed information, object direction information, object length information and confidence information for the length information, object width information and confidence information for the width information, and object type information have been described in Table 3, and thus a detailed description thereof is omitted.

As in Table 16, the POC data may further include lane information, action ID information, detection time information and/or event type information, which are classified as dynamic data, and a description thereof is as follows.

The lane information may indicate the number of a lane where an object is positioned. For example, the lane information may indicate the number of a lane where an object is positioned in such a way as to increase by 1 from an outside lane or may indicate the number of a lane where an object is positioned in such a way as to increase by 1 from an inside lane. This is the same as that described in Table 14. In order to distinguish between the lane information and lane information included in dynamic OVC data, the lane information included in the POC data may be referred to as the second lane information, object lane information or object lane number information.

The action ID information may be used to assign an ID for an operation of an object. Table 17 illustrates an illustrative ASN.1 representation of the action ID information.

TABLE 17

```
ASN.1 Representation : DE_ActionID
ActionID ::= INTEGER(0..4294967295)
```

Referring to Table 17, the action ID information is a DE, and may be an integer from 0 to 4294967295 to which an ID for an operation of an object is assigned.

The detection time information may indicate the time when an event occurred. Table 18 illustrates an illustrative ASN.1 representation of the detection time information.

TABLE 18

```
ASN.1 Representation : DE_TimeStampIts
TimestampIts ::= INTEGER {utcStartOf2004(0), oneMillisecAfterUTCStartOf2004(1)}
             (0..4398046511103)
```

Referring to Table 18, the detection time information is a DE and has a UTS format, and may be an integer from 0 to 4398046511103, which indicates the time when an event occurred in a 1 ms unit. The detection time information may be referred to as time stamp (TimeStampIts) information.

The event type information may indicate the type of event of a detected object. Table 19 may indicate an illustrative ASN.1 representation of the event type information.

TABLE 19

ASN.1 Representation : DF_CauseCode
CauseCode ::= SEQUENCE {causeCode CauseCodeType, subCauseCode SubCauseCodeType} CauseCodeType ::= INTEGER {reserved (0), trafficCondition (1), accident (2), roadworks (3), adverseWeatherCondition-Adhesion (6), hazardousLocation-SurfaceCondition (9), hazardousLocation-ObstacleOnTheRoad (10), hazardousLocation-AnimalOnTheRoad (11), humanPresenceOnTheRoad (12), wrongWayDriving (14), rescueAndRecoveryWorkInProgress (15), adverseWeatherCondition-ExtremeWeatherCondition (17), adverseWeatherCondition-Visibility (18), adverseWeatherCondition-Precipitation (19), slowVehicle (26), dangerousEndOfQueue (27), vehicleBreakdown (91), postCrash (92), humanProblem (93), stationaryVehicle (94), emergencyVehicleApproaching (95), hazardousLocation-DangerousCurve (96), collisionRisk (97), signalViolation (98), dangerousSituation (99) } (0..255)
SubCauseCodeType ::= INTEGER (0..255)
TrafficConditionSubCauseCode ::= INTEGER {unavailable(0), increasedVolumeOfTraffic(1), trafficJamSlowlyIncreasing(2), trafficJamIncreasing(3), trafficJamStronglyIncreasing(4), trafficStationary(5), trafficJamSlightlyDecreasing(6), trafficJamDecreasing(7), trafficJamStronglyDecreasing(8)} (0..255)
AccidentSubCauseCode ::= INTEGER {unavailable(0), multiVehicleAccident(1), heavyAccident(2), accidentInvolvingLorry(3), accidentInvolvingBus(4), accidentInvolvingHazardousMaterials(5), accidentOnOppositeLane(6), unsecuredAccident(7), assistanceRequested(8)} (0..255) ... etc...

Referring to Table 19, the event type information is a DF, and may indicate the type of event of a detected object. The event type information may be referred to as cause code (CauseCode) information.

In one embodiment, the event type information may include cause code type (CauseCodeType) information and subcause code type (SubCauseCodeType) information. The cause code type information may be referred to as type information. The subcause code type information may be referred to as sub type information.

In one embodiment, the cause code type information may be an integer from 0 to 255 indicating the type of event. For example, when the cause code type information is 1, the cause code type information may notify that a corresponding event is an event related to a traffic condition. The cause code type information may be set as a predefined value in order to indicate the type of corresponding event through such a method.

In one embodiment, the subcause code type information may be an integer from 0 to 255 indicating the subtype of event. In this case, different subcause code type information may be defined depending on the cause code type information. For example, when the cause code type information indicates that a corresponding event is an event related to a traffic condition, the subcause code type information may indicate the sub type or situation of the event related to the traffic condition. For example, when the cause code type information is 1 and the subcause code type information is 1, the subcause code type information may indicate that a traffic condition is an "increasedVolumeOfTraffic" state. Alternatively, when the cause code type information is 1 and the subcause code type information is 2, the subcause code type information may indicate that a traffic condition is a "trafficJamSlowlyIncreasing" state. Alternatively, when the cause code type information is 1 and the subcause code type information is 3, the subcause code type information may indicate that a traffic condition is a "trafficJamIncreasing" state.

FIG. 13 illustrates the structure of a second type of a CPM message according to an embodiment of the disclosure. The second type CPM message may be referred to as a second type static/dynamic message.

Referring to FIG. 13, the second type CPM message may include an ITS PDU header, a static container and/or a dynamic container. Unlike in the embodiment of FIG. 12, in the embodiment of FIG. 13, an FoVC container may include static data and dynamic data. The static data of the FoVC container may be referred to as static FoVC data, and the dynamic data of the FoVC container may be referred to as dynamic FoVC data.

For example, as illustrated in FIG. 13, the static data of an OVC container and the static data of an FoVC container may be included in a static container. The dynamic data of an OVC container and the dynamic data of a POC container may be included in a dynamic container. Meanwhile, unlike in the first type CPM message, in the second type CPM message, the static data of a POC container may be included in a static container. Furthermore, in the second type CPM message, dynamic FoVC data may be included in a dynamic container, and static FoVC data may be included in a static container.

Unlike in the first type CPM message in which all the data of the FoVC container is included in the static container and all the data of the POC container is included in the dynamic container as described above, in the second type CPM message, the static data of the FoVC container and POC container is included in the static container and the dynamic data of the FoVC container and POC container are included in the dynamic container based on the type of classified data. That is, unlike in the first type CPM message, in the second type CPM message, the static container may include only static data, and the dynamic container may include only dynamic data.

Hereinafter, the second type CPM message is specifically described with reference to Table 20 to Table 21.

Table 20(a) illustrates static FoVC data included in a static container, and Table 20(b) illustrates dynamic FoVC data included in a dynamic container. The static FoVC data and the dynamic FoVC data are data frames (DF), and may be configured in a sequence form.

TABLE 20

| ASN.1 Representation | |
|---|---|
| DF_StaticFieldofVewContainer | ::= SEQUENCE { |
|    SensorID | - Static |
|    SensorType | - Static |

TABLE 20-continued

|  |  |
|---|---|
| SensorPositionX | - Static |
| SensorPositionY | - Static |
| Radius | - Static |
| OpeningAngle | - Static |
| EndAngle | - Static |
| QualityClass | - Static |
| } | |

(a)

| ASN.1 Representation | |
|---|---|
| DF__DynamicFieldofVewContainer | ::= SEQUENCE { |
| SensorID | - Static |
| SensorRawData | - Dynamic |
| } | |

(b)

(a) Static FoVC field configuration
(b) Dynamic FoVC field configuration

Referring to Table 20(a), the static FoVC data may include sensor ID information, sensor type information, sensor position information, radius information, open angle information, end angle and/or quality class information, which are classified as static data in the FoVC container.

They have been described in Table 2, and thus a detailed description thereof is omitted.

Referring to Table 20(b), the dynamic FoVC data may include sensor ID information and/or sensor raw data information, which are classified as dynamic data in the FoVC container.

The sensor ID information is classified as static data, but may also be included in dynamic FoVC data for the connection of the dynamic FoVC data and the static FoVC data. In this case, a sensor identified by sensor ID information included in the dynamic FoVC data and a sensor identified by sensor ID information included in the static FoVC data may be the same sensor. That is, the dynamic FoVC data and the static FoVC data may be interconnected through the matching of the sensor ID information included in the dynamic FoVC data and the sensor ID information included in the static FoVC data. Accordingly, a reception V2X communication device can obtain full sensor information for a corresponding sensor by fully obtaining dynamic FoVC data and static FoVC data for the same sensor.

The sensor raw data information may be used to provide raw data sensed by a sensor. In one embodiment, the sensor raw data information may include sensor raw data type information, sensor raw data format information and/or sensor raw data value information.

The sensor raw data type information may indicate the type of raw data of a sensor. The sensor raw data format information may indicate the format of raw data of a sensor. The sensor raw data value information may be used to provide a value of data that actually contains the raw data of a sensor.

Table 21(a) illustrates static POC data included in a static container. Table 21(b) illustrates dynamic POC data included in a dynamic container. The static POC data and dynamic POC data are data frames (DF), and may be configured in a sequence form.

TABLE 21

| ASN.1 Representation | | |
|---|---|---|
| DF__StaticPerceivedObjectContainer | ::= SEQUENCE { | |
| ObjectID | DE__ObjectID | - Static |
| ObjectLengthValue | DE__Length | - Static |
| ObjectLengthConfidence | DE__Confidence | - Static |
| ObjectWidthValue | DE__Length | - Static |
| ObjectWidthConfidence | DE__Confidence | - Static |
| ObjectHeightValue | DE__Length | - Static |
| ObjectHeightConfidence | DE__Confidence | - Static |
| ObjectType | DE__ObjectType | - Static |
| } | | |

(a)

| ASN.1 Representation | | |
|---|---|---|
| DF__DynamicPerceived ObjectContainer | ::= SEQUENCE { | |
| TimeOfMeasurement | TimeOfMeasurement | - Dynamic |
| ObjectID | DE__ObjectID | - Dynamic |
| SensorID | DE__SensorID | - Dynamic |
| LongitudinalDistanceValue | refer to ISO 8855 | - Dynamic |
| LongitudinalDistanceConfidence | refer to ISO 8855 | - Dynamic |
| LateralDistanceValue | refer to ISO 8855 | - Dynamic |
| LateralDistanceConfidence | refer to ISO 8855 | - Dynamic |
| LongitudinalSpeed | reference from CDD | - Dynamic |
| LateralSpeed | reference from CDD | - Dynamic |
| ObjectHeading | reference from CDD | - Dynamic |
| LaneNumber | | - Dynamic |
| ActionID | | - Dynamic |
| DetectionTime | | - Dynamic |
| EventType | | - Dynamic |
| } | | |

(b)

(a) Static POC field configuration
(b) Dynamic POC field configuration

Referring to Table 21(a), the static POC data may include object ID information, object length information and confidence information therefor, object width information and confidence information therefor, object height information and confidence information therefor and/or object type information, which classified as static data in the POC container. The object length information and confidence information therefor, object width information and confidence information therefor and object type information have been described in Table 3 and Table 9, and thus a detailed description thereof is omitted.

In the embodiment of Table 20(a), the static POC data may further include object ID information and/or object height information and confidence information therefor, and a description thereof is as follows.

The object ID information is classified as dynamic data, but may also be included in static FoVC data for the connection of dynamic POC data and static POC data. In this case, an object identified by object ID information included in the dynamic POC data and an object identified by object ID information included in the static POC data may be the same object. That is, the dynamic POC data and the static POC data may be interconnected through the matching of sensor ID information included in the dynamic POC data and sensor ID information included in the static POC data. Accordingly, a reception V2X communication device can obtain full object information for a corresponding object by fully obtaining dynamic POC data and static POC data for the same object.

The object height information may indicate the height of an object.

Confidence information for object height information (object height confidence information) may indicate the confidence of the height of an object.

Referring to Table 21(b), the dynamic POC data may include measurement time information, object ID information, sensor ID information, longitudinal distance information and confidence information therefor, lateral distance information and confidence information therefor, longitudinal speed information, lateral speed information, object direction information, lane information, action ID information, detection time information and/or event type information, which are classified as dynamic data in a POC container. They have been described in Table 3 and Table 9, and thus a detailed description thereof is omitted.

FIG. 14 illustrates the structure of a third type of a CPM message according to an embodiment of the disclosure. The third type CPM message may be referred to as a third type static/dynamic message.

Referring to FIG. 14, the third type CPM message may include an ITS PDU header, an OVC container, a static container and/or a dynamic container. Unlike in the embodiments of FIGS. 12 and 13, in the embodiment of FIG. 14, a CPM message may include an OVC container.

Meanwhile, in the case of the third type CPM message, the classification of the data of an FoVC container and POC container included in a static container and dynamic container may follow any one of the classification method (e.g., a method of classifying a first type CPM message) in the embodiment of FIG. 12 or the classification method (e.g., a method of classifying a second type CPM message) in the embodiment of FIG. 13.

For example, as in the method of classifying a first type CPM message, the static container of a third type CPM message may include all the data of an FoVC container, and a dynamic container may include all the data of a POC container. For another example, as illustrated in FIG. 14, as in the method of classifying a second type CPM message, the static container of a third type CPM message may include the static data of an FoVC container and the static data of a POC container, and the dynamic container thereof may include the dynamic data of an FoVC container and the dynamic data of a POC container. In this case, sensor ID information may be used to connect the static data of the FoVC container and the dynamic data of the FoVC container. Furthermore, object ID information may be used to connect the static data of the POC container and the dynamic data of the POC container.

Hereinafter, a method of transmitting the new type of a CPM message is described. For convenience of description, a method of transmitting the new type of a CPM is described by chiefly taking the first type CPM message and the second type CPM message as examples. Meanwhile, a method of transmitting the third type CPM message may be easily inferred by those skilled in the art from a method of transmitting the first type CPM message and the second type CPM message. The reason for this is that he third type CPM message is different in that a CPM message always includes an OVC container, but a method of configuring the dynamic container and static container of the third type CPM message using an FoVC container and a POC container follows a method of configuring the first type CPM message or a method of configuring the second type CPM message.

FIG. 15 illustrates a method of operating a CPM message by the V2X communication device according to an embodiment of the disclosure. Particularly, FIG. 15 illustrates a method of operating, by the V2X communication device, a static container and a dynamic container.

Referring to FIG. 15, dynamic CPM data, that is, the data of a dynamic container, may be always included and transmitted in a CPM message when the CPM is transmitted. Static CPM data, that is, the data of a static container, may be included and transmitted in a CPM message once for each preset interval. As illustrated, the dynamic CPM data may continue to be transmitted for t1 to t8 times, and the static CPM data may be transmitted only in a t4 time and a t8 time.

FIG. 16 illustrates a method of operating the first type CPM message by the V2X communication device according to an embodiment of the disclosure. Specifically, FIG. 16A illustrates a method of operating the first type CPM message by the V2X communication device according to an embodiment of the disclosure. FIG. 16B illustrates a method of operating the second type CPM message by the V2X communication device according to an embodiment of the disclosure.

In the embodiment of FIG. 16A, a first type CPM message may be divided into a dynamic-only CPM message or a full CPM message depending on whether static CPM data is included, and may be operated. For example, a first type CPM message transmitted at each of t1, t2, t3, t5, t6 and t7 times in FIG. 15 may have the structure of a dynamic-only CPM message. Alternatively, a first type CPM message transmitted at each of t4 and t8 times in FIG. 15 may have the structure of a full CPM message. In the present disclosure, the dynamic-only CPM message may be referred to as a dynamic CPM message.

The upper side of FIG. 16A illustrates a first type CPM message operated as the structure of a dynamic-only CPM message. Referring to FIG. 16A, the dynamic-only CPM message of the first type CPM message may include an ITS PDU header and a dynamic container including dynamic OVC data and POC data. As described above, the dynamic-only CPM message includes the data of the ITS PDU header and the dynamic CPM data, but does not include static CPM data.

The lower side of FIG. 16A illustrates a first type CPM message operated as the structure of a full CPM message. Referring to the lower side of FIG. 16A, the full CPM message of the first type CPM message may include an ITS PDU header, a static container including static OVC data and FoVC data, and a dynamic container including dynamic OVC data and POC data. As described above, the full CPM message may include all of the data of the ITS PDU header, the dynamic CPM data and the static CPM data.

In the embodiment of FIG. 16B, a second type CPM message may be divided into a dynamic-only CPM message or a full CPM message depending on whether static CPM data is included, and may be operated. For example, the second type CPM message transmitted at each of the t1, t2, t3, t5, t6 and t7 times in FIG. 15 may have the structure of a dynamic-only CPM message. Alternatively, the second type CPM message transmitted at each of the t4 and t8 times in FIG. 15 may have the structure of a full CPM message.

The upper side of FIG. 16B illustrates a second type CPM message operated as the structure of a dynamic-only CPM message. Referring to the upper side of FIG. 16B, the dynamic-only CPM message of the second type CPM message may include an ITS PDU header, and a dynamic container including dynamic OVC data, dynamic FoVC data and dynamic POC data. As described above, the dynamic-only CPM message includes the data of the ITS PDU header and the dynamic CPM data, but does not include static CPM data.

The lower side of FIG. 16B illustrates a second type CPM message operated as the structure of a full CPM message. Referring to the lower side of FIG. 16B, the full CPM message of the second type CPM message may include an ITS PDU header, a static container including static OVC data, static FoVC data and static FoVC data, and a dynamic container including dynamic OVC data, dynamic FoVC data and dynamic POV data. As described above, the full CPM message may include all of the data of the ITS PDU header, the dynamic CPM data and the static CPM data.

FIG. 17 illustrates a method of operating the second type CPM message by the V2X communication device according to an embodiment of the disclosure. Specifically, FIG. 17A illustrates a first embodiment in which the V2X communication device according to an embodiment of the disclosure operates the third type CPM message. FIG. 17B illustrates a second embodiment in which the V2X communication device according to an embodiment of the disclosure operates the third type CPM message. Unlike in the first type CPM message and second type CPM message of FIG. 16, the third type CPM message may always include an OVC container.

In the embodiment of FIG. 17A, the third type CPM message may be divided into a dynamic-only CPM message or a full CPM message depending on whether static CPM data is included, and may be operated. For example, the third type CPM message transmitted at each of the t1, t2, t3, t5, t6 and t7 times in FIG. 15 may have the structure of a dynamic-only CPM message. Alternatively, the third type CPM message transmitted at each of the t4 and t8 times in FIG. 15 may have the structure of a full CPM message.

Meanwhile, in the embodiment of FIG. 17A, the structure of a dynamic-only CPM message and the structure of a full CPM message of the third type CPM message are the same as the structure of a dynamic-only CPM message and the structure of a full CPM message of the first type CPM message in FIG. 16A except that an OVC container is included.

Referring to the upper side of FIG. 17A, the dynamic-only CPM message of the third type CPM message may include an ITS PDU header, an OVC container, and a dynamic container including dynamic OVC data and POC data. As described above, the dynamic-only CPM message includes the data of the ITS PDU header and the dynamic CPM data, but does not include static CPM data.

Referring to the lower side of FIG. 17A, the full CPM message of the third type CPM message may include an ITS PDU header, an OVC container, a static container including static OVC data and FoVC data, and a dynamic container including dynamic OVC data and POC data. As described above, the full CPM message may include all of the data of the ITS PDU header, the dynamic CPM data and the static CPM data.

In the embodiment of FIG. 17B, a third type CPM message may be divided into a dynamic-only CPM message or a full CPM message depending on whether static CPM data is included, and may be operated. For example, the third type CPM message transmitted at each of the t1, t2, t3, t5, t6 and t7 times in FIG. 15 may have the structure of a dynamic-only CPM message. Alternatively, the third type CPM message transmitted at each of the t4 and t8 times in FIG. 15 may have the structure of a full CPM message.

Meanwhile, in the embodiment of FIG. 17B, the structure of a dynamic-only CPM message and the structure of a full CPM message of the third type CPM message are the same as the structure of a dynamic-only CPM message and the structure of a full CPM message of the second type CPM message in FIG. 16B except that an OVC container is included.

Referring to the upper side of FIG. 17B, the dynamic-only CPM message of the third type CPM message may include an ITS PDU header, an OVC container, and a dynamic container including dynamic OVC data, dynamic FoVC data and dynamic POC data. As described above, the dynamic-only CPM message includes the data of the ITS PDU header and the dynamic CPM data, but does not include static CPM data.

Referring to the lower side of FIG. 17B, the full CPM message of the third type CPM message may include an ITS PDU header, an OVC container, a static container including static OVC data, static FoVC data and static FoVC data, and a dynamic container including dynamic OVC data, dynamic FoVC data and dynamic POV data. As described above, the full CPM message may include all of the data of the ITS PDU header, the dynamic CPM data and the static CPM data.

As described above, static CPM data is data that provides information having a static characteristic, and includes information that is not changed when the data is received once, in general. The static CPM data is treated as data having lower importance than dynamic CPM data. In contrast, dynamic CPM data is data that provides information having a dynamic characteristic, and includes information changed over a flow of time, in general. The dynamic CPM data is treated as data having higher importance than static CPM data. For example, dynamic CP data includes core information (e.g., position information, speed information, etc. of an object) in order to provide a CP service, and thus needs to be frequently transmitted at a shorter interval for the safety of a vehicle.

If CPM data is transmitted using a conventional CPM message structure such as FIG. 5, however, a CPM message including static CPM data and dynamic CPM data is generated and transmitted without considering the importance of the CPM data. In this case, if the transmission interval of the CPM message is increased because a channel state becomes deteriorated, the transmission interval of dynamic CPM data having high importance is also increased. Accordingly, it is necessary to consider a scheme for classifying static CPM data and dynamic CPM data and transmitting the dynamic CPM data having high importance in a shorter interval compared to the static CPM data. In this case, there is an advantage in that more useful information/data can be transmitted more frequently compared to the existing method while the same channel resource is used.

Hereinafter, three new methods of operating a CPM message, which are used to improve transmission efficiency, are described. The first method is a method of including static CPM data in a CPM message and transmitting the CPM message at a given interval (interval transmission method). The second method is a method of transmitting static PCM data only when a predefined event occurs not at a given interval (event trigger transmission method). The third method is a method of mixing the two methods (hybrid transmission method). In each of the methods, in general, dynamic CPM data may be transmitted more frequently compared to static CPM data.

FIG. 18 illustrates a method of operating a CPM message by the V2X communication device using an interval transmission method according to an embodiment of the disclosure. FIG. 19 illustrates a method of transmitting, by the V2X communication device according to an embodiment of the disclosure, a CPM message using the interval transmission method. The interval transmission method is a method of including static CPM data in a CPM message at a given interval and transmitting the CPM message.

Referring to FIG. 18, dynamic CPM data may be transmitted at a preset first interval (T1=Tinterval) for t1 to t8 times. Static CPM data may be transmitted at a preset second interval (T2) for t1 to t8 times. In one embodiment, the first interval may be shorter than the second interval.

If the interval transmission method is used, a surrounding the V2X communication device can periodically receive static CPM data because the static CPM data is periodically included and transmitted in a CPM message. In one embodiment, the second interval may be determined by a parameter (NDynamic/Static) value indicative of the ratio of transmission frequency of dynamic CPM data and transmission frequency of static CPM data. The parameter (NDynamic/Static) may be referred to as a dynamic/static data transmission ratio or a data transmission ratio. For example, as illustrated, if static CPM data is transmitted once whenever dynamic CPM data is transmitted twice, the NDynamic/Static value may be 2, and the second interval may be two times of Tinterval.

Referring to FIG. 19, a transmission V2X communication device may transmit a dynamic-only CPM message including dynamic CPM data at each of t1, t3, and t5 times. Furthermore, at each of t2 and t4 times, the transmission V2X communication device may transmit a full CPM message including dynamic CPM data and static CPM data. Such a dynamic-only CPM message and full CPM message are the same as those described in FIGS. 16 and 17.

At the t1 time, a reception V2X communication device may receive the dynamic-only CPM message including the dynamic CPM data, and may obtain the dynamic CPM data. However, the reception V2X communication device cannot obtain static CPM data. Accordingly, the reception V2X communication device cannot provide a CP service using full CPM data because it cannot obtain the full CPM data.

Meanwhile, at the t2 time, the reception V2X communication device may receive the full CPM message including the dynamic CPM data and the static CPM data, and may obtain the dynamic CPM data and the static CPM data. Accordingly, the reception V2X communication device can provide a CP service using the full CPM data. In this case, the static CPM data may be saved.

At the t3 time, the V2X communication device may receive the dynamic-only CPM message including the dynamic CPM data, and may obtain the dynamic CPM data. However, unlike at the t1 time, at the t3 time, the reception V2X communication device may use the static CPM data obtained and saved at the t2 time. Accordingly, the reception V2X communication device can provide a CP service using the dynamic CPM data obtained at the t3 time and the saved static CPM data.

At the t4 time, the reception V2X communication device may perform an operation, such as that at the t2 time. Furthermore, at the t5 time, the reception V2X communication device may perform an operation, such as that at the t3 time.

FIG. 20 illustrates a method of operating a CPM message by the V2X communication device using an event trigger transmission method according to an embodiment of the disclosure. FIG. 21 illustrates a method of transmitting, by the V2X communication device according to an embodiment of the disclosure, a CPM message using the event trigger transmission method. The event trigger transmission method may be a method of transmitting static PCM data only when a predefined event occurs not at a given interval. For example, as in FIG. 20, a transmission V2X communication device using the event trigger transmission method may enter may transmit static CPM data when a new vehicle nearby is entered and detected or perceived by the transmission V2X communication device. In one embodiment, a transmission V2X communication device may detect or perceive a new vehicle using its own sensor or a V2X message/data transmitted by a surrounding V2X communication device. In the present disclosure, the event trigger transmission method may be abbreviated as an event transmission method.

Referring to FIG. 20, dynamic CPM data is transmitted at preset first intervals (T1=Tinterval) for t1 to t8 times. Static CPM data may be transmitted only when a predefined event occurs (e.g., t4 time).

If the event trigger transmission method is used, static CPM data is not periodically included and transmitted in a CPM message, but is included and transmitted in a CPM message only when a predefined event occurs. Accordingly, a surrounding V2X communication device cannot periodically receive static CPM data, and can receive static CPM data only when an event occurs.

However, if the detection or perception of a new vehicle by a transmission V2X communication device is set as a predefined event, the V2X communication device of a new vehicle can directly obtain static CPM data by receiving a CPM message including static CPM data at an event occurrence time (Tevent). If the event trigger transmission method of such a method is used, a transmission V2X communication device can use a radio frequency resource in an efficient manner because it can receive static CPM data only when a new vehicle is perceived or detected. Furthermore, a reception V2X communication device has an advantage in that it can provide a CP service without delay because it can receive a full CPM message including static CPM data and dynamic CPM data upon first entry.

Referring to FIG. 21, at each of t3, t5, and t6 times, a transmission V2X communication device may transmit a dynamic-only CPM message including dynamic CPM data. Furthermore, at a t4 time, that is, a next interval right after an event occurred, or at timing in which an event occurs, the transmission V2X communication device may transmit a full CPM message including dynamic CPM data and static CPM data. Such a dynamic-only CPM message and full CPM message have been described in FIGS. 16 and 17.

At the t3 time, a reception V2X communication device may receive the dynamic-only CPM message including dynamic CPM data and obtain the dynamic CPM data. However, the reception V2X communication device cannot obtain static CPM data. Accordingly, the reception V2X communication device cannot provide a CP service using full CPM data because it cannot obtain the full CPM data.

Meanwhile, at a t4 time, the reception V2X communication device may receive a full CPM message including dynamic CPM data and static CPM data, and may obtain the dynamic CPM data and the static CPM data. Accordingly, the reception V2X communication device can provide a CP service using the full CPM data.

At the t5 time, the V2X communication device may receive the dynamic-only CPM message including dynamic CPM data, and may obtain the dynamic CPM data. However, unlike at the t3 time, at the t5 time, the reception V2X communication device may use the static CPM data obtained and saved at the t4 time. Accordingly, the reception V2X communication device can provide a CP service using the dynamic CPM data obtained at the t5 time and the saved static CPM data.

At the t6 time, the reception V2X communication device may perform an operation such as that at the t5 time.

FIG. 22 illustrates a method of operating a CPM message by the V2X communication device using a hybrid transmission method according to an embodiment of the disclosure. FIG. 23 illustrates a method of transmitting, by the V2X communication device according to an embodiment of the disclosure, a CPM message using the hybrid transmission method. The hybrid transmission method is a transmission method in which the interval transmission method and the event transmission method have been mixed, and may be a method of transmitting static CPM data at given intervals and also additionally transmitting static PCM data when a predefined event occurs. For example, a transmission V2X communication device using the hybrid transmission method may transmit static CPM data at given intervals as in FIG. 18, and may additionally transmit static CPM data when an event, such as that in FIG. 20, occurs.

Referring to FIG. 22, dynamic CPM data may be transmitted at preset first intervals (T1=Tinterval) during t1 to t8 times, and static CPM data may be transmitted at preset second intervals (T2) during t1 to t8 times. In this case, the first interval may be shorter than the second interval. Furthermore, the static CPM data may be transmitted only when a predefined event occurs (e.g., t4 time).

If the hybrid transmission method is used, static CPM data may be periodically included and transmitted in a CPM message, and may be included and transmitted in a CPM message when a predefined event occurs. Accordingly, a surrounding V2X communication device can periodically receive static CPM data, and can also receive static CPM data when an event occurs.

For example, if the interval transmission method is used, when entering between the t3 time and the t4 time, a reception V2X communication device cannot obtain full CPM data until the next transmission interval (t7) in which static CPM data is received, and thus cannot provide a CP service using the full CPM data. However, if the hybrid transmission method is used, at the transmission interval (t4) after the time when an event occurs or when an event occurs, the reception V2X communication device can receive a full CPM message including static CPM data and dynamic CPM data, and can provide a CP service without delay using the full CPM message.

Referring to FIG. 23, at each of t1, t4, t6, and t7 times, a transmission V2X communication device may transmit a dynamic-only CPM message including dynamic CPM data. Furthermore, at each of t2, t5, and t8 times, the transmission V2X communication device may transmit a full CPM message including dynamic CPM data and static CPM data.

Furthermore, at a t3 time, that is, a next interval right after an event occurs, or right after an event occurs, the transmission V2X communication device may transmit a full CPM message including dynamic CPM data and static CPM data. Such a dynamic-only CPM message and full CPM message have been described in FIGS. 16 and 17.

At the t1 time, a reception V2X communication device (Rx1) may receive a dynamic-only CPM message including dynamic CPM data, and may obtain the dynamic CPM data. However, the reception V2X communication device cannot obtain static CPM data. Accordingly, the reception V2X communication device cannot obtain full CPM data, and thus cannot provide a CP service using the full CPM data.

At the t2 time, the reception V2X communication device (Rx1) may receive the full CPM message including dynamic CPM data and static CPM data, and may obtain the dynamic CPM data and the static CPM data. Accordingly, the reception V2X communication device can provide a CP service using the full CPM data.

Meanwhile, in the embodiment of FIG. 23, it is assumed that an event in which a vehicle newly enters between the t2 time and the t3 time occurs.

At the t3 time after the time when such an event occurred, the reception V2X communication devices (Rx1 and Rx2) may receive the full CPM message including dynamic CPM data and static CPM data, and may obtain the dynamic CPM data and the static CPM data. Accordingly, the reception V2X communication device can provide a CP service using the full CPM data.

At the t4 time, the V2X communication device may receive the dynamic-only CPM message including dynamic CPM data, and may obtain the dynamic CPM data. However, unlike at the t1 time, at the t4 time, the reception V2X communication device may use static CPM data obtained and saved at the t3 time. Accordingly, the reception V2X communication device can provide a CP service using the dynamic CPM data obtained at the t4 time and the saved static CPM data.

At the t5 and t8 times, the reception V2X communication device may perform an operation, such as that at the t2 time. Furthermore, at the t6 and t7 times, the reception V2X communication device may perform an operation, such as that at the t4 time.

FIG. 24 is a flowchart of a method of transmitting a CPM message by a transmission V2X communication device according to an embodiment of the disclosure.

First, the transmission V2X communication device may perform a system initialization procedure. Accordingly, when the system is driven, the transmission V2X communication device may sense a surrounding environment using a sensor mounted on a vehicle, may detect an object using the sensed data, and may track the detected object. Accordingly, the transmission V2X communication device may obtain information on an object (object information). Furthermore, the transmission V2X communication device may set a dynamic/static data transmission ratio (NDynamic/Static) and the transmission interval (Tinterval) of dynamic CPM data.

The transmission V2X communication device may select a transmission mode/method of a CPM message to be transmitted. As described above, the transmission mode/method of a CPM message may include an interval transmission mode/method, an event trigger transmission mode/method or a hybrid transmission mode/method.

If the interval transmission method is selected, the transmission V2X communication device may set the transmission time/interval of a dynamic-only CPM message including dynamic CPM data and the transmission time/interval of a full CPM message including dynamic CPM data and static CPM data using a transmission interval (Tinterval) and a dynamic/static data transmission ratio (NDynamic/Static). The transmission V2X communication device may transmit a dynamic-only CPM message or a full CPM message based on the set transmission interval/time. This is the same as that described in FIGS. 18 and 19.

If the event trigger transmission method is selected, the transmission V2X communication device may set the transmission time/interval of a dynamic-only CPM message including dynamic CPM data using a transmission interval (Tinterval). The transmission V2X communication device may determine whether an event has occurred by analyzing a radio signal (e.g., radio signal including a CPM message) received from its own sensor or a surrounding V2X communication device. The transmission V2X communication device may transmit a dynamic-only CPM message based on the set transmission interval/time, and may transmit a full CPM message when an event occurs. This has been described in FIGS. 20 and 21.

If the hybrid transmission method is selected, the transmission V2X communication device may set the transmission time/interval of a dynamic-only CPM message including dynamic CPM data and the transmission time/interval of a full CPM message including dynamic CPM data and static CPM data using a transmission interval (Tinterval) and a dynamic/static data transmission ratio (NDynamic/Static). Furthermore, the transmission V2X communication device may determine whether an event has occurred by analyzing a radio signal received from its own sensor or a surrounding V2X communication device. The transmission V2X communication device may transmit a dynamic-only CPM message or a full CPM message based on the set transmission interval/time. Furthermore, when an event occurs, the transmission V2X communication device may transmit a full CPM message. This has been described in FIGS. 22 and 23.

If it is determined that a dynamic-only CPM message is transmitted, the transmission V2X communication device may generate a dynamic container including dynamic CPM data, and may generate a CPM message including the dynamic container (dynamic-only CPM message). If it is determined that a full CPM message is transmitted, the transmission V2X communication device may generate a dynamic container including dynamic CPM data and a static container including static CPM data, and may generate a CPM message including the dynamic container and the static container (full CPM message). In this case, the generation of the dynamic container and the static container may be performed in the reverse order of the order illustrated in FIG. 24.

Thereafter, the transmission V2X communication device may generate a networking/transport layer packet by performing networking/transport layer processing on the generated CPM message, may generate a radio signal by performing access layer processing on the networking/transport layer packet, and may transmit the radio signal. Thereafter, if the system is not terminated, the transmission V2X communication device may wait up to a next transmission interval, and may perform the aforementioned procedure again at the next transmission interval.

FIG. 25 is a flowchart of a method of receiving a CPM message by a reception V2X communication device according to an embodiment of the disclosure.

First, a reception V2X communication device may perform a system initialization procedure. Accordingly, when the system is driven, the reception V2X communication device may wait in a V2X reception mode in order to receive a CPM message.

When the CPM message is received, the reception V2X communication device may decode or decipher the CPM message. Thereafter, the reception V2X communication device may identify the type of CPM message.

When a full CPM message including static CPM data and dynamic CPM data is received, the reception V2X communication device may obtain the static CPM data and the dynamic CPM data. Thereafter, the reception V2X communication device may generate/obtain OVC data, FoVC data and POC data from the static CPM data and the dynamic CPM data. The sequence in which the information is generated/obtained may be different from that illustrated in FIG. 25. In this case, the static CPM data may be saved. Furthermore, the reception V2X communication device may deliver the obtained OVC data, FoVC data and POC data to an application layer.

When a dynamic-only CPM message including dynamic CPM data is received, the reception V2X communication device may determine whether static CPM data has been saved. If the static CPM data has been saved, the reception V2X communication device may load the static CPM data, and may perform the same processing as the processing of a full CPM message using the static CPM data. Alternatively, if static CPM data has not been stored, the reception V2X communication device may obtain dynamic CPM data, may obtain OVC data and POC data from the dynamic CPM data, and may deliver the OVC data and POC data to the application layer.

Hereinafter, the results of a performance comparison between the CPM transmission using the CPM message structure of FIG. 5 and CPM transmission using new message structures, for example, the first type CPM message structure of FIG. 12, the second type CPM message structure of FIG. 13, and the third type CPM message structure of FIG. 14 are described. Hereinafter, a CPM message having the CPM message structure of FIG. 5 is referred to as a CPM. A CPM message having the first type CPM message structure of FIG. 12 is referred to as an ECPM1. A CPM message having the second type CPM message structure of FIG. 13 is referred to as an ECPM2. A CPM message having the third type CPM message structure of FIG. 14 is referred to as an ECPM3.

In the following performance experiments, the interval transmission method not the event trigger transmission method through which prediction is impossible is used for a method of transmitting a CPM message. In this case, the transmission interval of static CPM data may be adjusted through a dynamic/static transmission ratio. For example, when twice dynamic CPM data is transmitted, if one static CPM data is transmitted, the dynamic/static transmission ratio is indicated as 1/2. The dynamic/static transmission ratio may be referred to as a static container transmission ratio.

FIG. 26 illustrates a performance comparison between CPM transmission using the existing CPM structure and CPM transmission using a new CPM message structure according to an embodiment of the disclosure.

FIGS. 26A and 26B illustrate performance comparisons between the CPM and the ECPMs according to static container transmission ratios when the number of sensors is small. FIGS. 26A and 26B illustrate performance comparisons between the CPM and the ECPMs by comparing and analyzing the sizes of the CPM and the ECPMs according to static container transmission ratios under the condition in which the number of sensors is 10 and the number of objects is 5. Each of the sizes of the CPM and the ECPM is about 1700 bytes because the number of sensors is many.

Referring to FIG. 26A, if the ECPM is used, the size of the message corresponding to about 600 bytes can be reduced when the static container transmission ratio is 1/2, compared to a case where the CPM is used. Meanwhile, if the ECPM is used, the size of the message is further reduced because transmission frequency of static CPM data is reduced as the static container transmission ratio is reduced. Furthermore, referring to FIG. 26B, it may be seen that if the ECPM is used, there is no difference in the size of the message when the static container transmission ratio is 0 and the size of the message is reduced by about half when the static container transmission ratio is 1/4, compared to a case where the CPM is used. It can be seen that performance can be improved because the same function can be performed using a smaller message size compared to a case where the CPM is used if the ECPM is used as described above.

Meanwhile, referring to FIGS. 26A and 26B, it may be seen that the ECPM2 of the proposed ECPMs has the best performance.

FIGS. 26C and 26D illustrate performance comparisons between the CPM and the ECPMs according to static container transmission ratios when the number of sensors is small. FIGS. 26C and 26D illustrate performance comparisons between the CPM and the ECPMs by comparing and analyzing the sizes of the CPM and the ECPMs according to static container transmission ratios under the condition in which the number of sensors is 1 and the number of objects is 5. Each of the sizes of the CPM and the ECPM becomes about 680 bytes because the number of sensors is small.

Referring to FIG. 26C, if the ECPM is used, the size of the message corresponding to about 60 bytes can be reduced when the static container transmission ratio is 1/2, compared to a case where the CPM is used. Meanwhile, if the ECPM is used, the size of the message is further reduced because transmission frequency of static CPM data is reduced as the static container transmission ratio is reduced. Furthermore, referring to FIG. 26D, it may be seen that if the ECPM is used, there is no difference in the size of the message when the static container transmission ratio is 0 and the size of the message corresponding to about 10 percent is reduced when the static container transmission ratio is 1/2, compared to a case where the CPM is used. It may be seen that if the ECPM is used as described above, performance can be improved because the same function can be performed using a smaller message size, compared to a case where the CPM is used.

Meanwhile, referring to FIGS. 26C and 26D, it may be seen that the ECPM1 of the proposed ECPMs has the best performance.

FIG. 26C illustrates performance comparisons between the CPM and the ECPMs according to a change in the number of sensors. FIG. 26C illustrates performance comparisons between the CPM and the ECPMs by comparing and analyzing the sizes of the CPM and the ECPMs according to a change in the number of sensors under the condition in which the number of objects is 10 and the static container transmission ratio is 1/2.

Referring to FIG. 26C, if the ECPM is used, the size of the message corresponding to about 900 bytes can be reduced when the number of sensors is 9, compared to a case where the CPM is used. Meanwhile, it may be seen that if the ECPM is used, an increment of the size of the message is smaller than that of the CPM as the number of sensors is increased. Furthermore, referring to FIG. 26C, it may be seen that if the ECPM is used, the size of the message corresponding to about 5-8 percent is reduced when the number of sensors is 1 and the size of the message corresponding to about 20 percent is reduced as the number of sensors is increased, compared to a case where the CPM is used. That is, it may be seen that if the ECPM is used, performance improvements from about 5 percent to about 20 percent are achieved compared to a case where the CPM is used. It may be seen that if the ECPM is used, performance can be improved because the same function can be performed using a smaller message size compared to a case where the CPM is used as described above.

Meanwhile, referring to FIG. 26C, it may be seen that the ECPM2 of the proposed ECPMs has the best performance.

FIG. 26D illustrates performance comparisons between the CPM and the ECPMs according to a change in the number of objects. Referring to FIG. 26D, if the ECPM is used, the size of the message corresponding to about 500 bytes can be reduced when the number of objects is 2, compared to a case where the CPM is used. Furthermore, referring to FIG. 26D, it may be seen that if the ECPM is used, the size of the message corresponding to about 40 percent is reduced when the number of objects is 1, compared to a case where the CPM is used. However, if the number of objects is increased, the size of dynamic CPM data is more relatively increased than the size of static CPM data. Accordingly, compared to a case where the number of objects is small, relative low performance improvements are achieved. However, even in this case, performance improvements of about 20 percent compared to the CPM can be obtained. It may be seen that if the ECPM is used as described above, performance can be improved because the same function can be performed using a small message size, compared to a case where the CPM is used.

Meanwhile, referring to FIG. 26D, it may be seen that the ECPM2 of the proposed ECPMs has the best performance.

Hereinafter, the configuration of the V2X communication device for the aforementioned embodiments is described. Next, a method of transmitting or receiving a CPM by the V2X communication device is described.

FIG. 27 illustrates the configuration of the V2X communication device according to an embodiment of the disclosure. As described above, the V2X communication device may be referred to as a V2X communication apparatus or a V2X apparatus.

In FIG. 27, the V2X communication device 27000 may include a communication unit 27010, a processor 27020 and a memory 27030.

The communication unit 27010 is connected to the processor 27020 and may transmit/receive a radio signal. The communication unit 27010 may up-convert data, received from the processor 27020, into a transmission/reception band, or may transmit a signal or may down-convert the received signal. The communication unit 27010 may implement at least one operation of the physical layer or the access layer.

The communication unit 27010 may include a plurality of sub-RF units in order to perform communication according to a plurality of communication protocols. In one embodiment, the communication unit 27010 may perform data communication based on the ITS-G5 wireless communication technology based on the physical broadcast technology, such as dedicated short range communication (DSRC), IEEE 802.11 and/or 802.11p standard, IEEE 802.11 and/or 802.11p standard, the 2G/3G/4G(LTE)/5G wireless cellular communication technology including satellite/wideband wireless mobile communication, a wideband terrestrial digital broadcasting technology such as DVB-T/T2/ATSC, the GPS technology, or the IEEE 1609 WAVE technology. The communication unit 27010 may include a plurality of transceivers that implement the respective communication technologies.

The processor 27020 is connected to the RF unit 27030 and may implement operations of the layers of the V2X communication device. The processor 27020 may be configured to perform operations according to the various embodiments of the disclosure according to the drawings and description. Furthermore, at least one of a module, data, a program or software that implements operations of the V2X communication device 27000 according to the various embodiment of the disclosure may be stored in the memory 27010 and executed by the processor 27020.

The memory 27010 is connected to the processor 27020, and stores various pieces of information for driving the processor 27020. The memory 27010 is included inside the processor 27020 or installed outside the processor 27020, and may be connected to the processor 27020 by known means.

The processor 27020 of the V2X communication device 27000 may perform the generation and transmission of a CPM described in the disclosure. A method of generating and transmitting a CPM by the V2X communication device 27000 is described.

FIG. 28 is a flowchart illustrating a method of transmitting a CPM message by the V2X communication device according to an embodiment of the disclosure. In the embodiment of FIG. 28, the V2X communication device may be the V2X communication device of a vehicle. The vehicle has a sensor mounted thereon, and may detect a surrounding object using the sensor.

First, the V2X communication device may determine a transmission mode of a CPM message (S28010). As described above, the CPM message may be used to generate a collective perception for at least one object detected by the V2X communication device. In one embodiment, the transmission mode of the CPM message may include the interval transmission mode (method), the event trigger transmission mode (method) and/or the hybrid transmission mode (method). Each of the methods has been described in FIGS. 18 to 23.

The V2X communication device may transmit the CPM message based on the transmission mode (S28020). In one embodiment, the CPM message may correspond to any one of a dynamic CPM message for transmitting dynamic data or a full CPM message for transmitting dynamic data and static data. The dynamic CPM message may include a dynamic container including dynamic data. The full CPM message may include a dynamic container including dynamic data and a static container including static data. The dynamic CPM message may be referred to as a dynamic-only CPM message. The dynamic data may be referred to as dynamic CPM data. The static data may be referred to as static CPM data.

In one embodiment, if the transmission mode is the interval transmission mode, the step of transmitting the CPM message may include transmitting a CPM message corresponding to a dynamic CPM message at a first transmission interval, and transmitting a CPM message corresponding to a full CPM message at a second transmission interval different from the first transmission interval. In this case, the first transmission interval may be shorter than the second transmission interval. This has been described in FIGS. 18 to 19.

In one embodiment, if the transmission mode is the event trigger transmission mode, the step of transmitting the CPM message may include periodically transmitting a CPM message corresponding to a dynamic CPM message and transmitting a CPM message corresponding to a full CPM message when a predefined event occurs. This has been described in FIGS. 20 to 21.

In one embodiment, if the transmission mode is the hybrid transmission mode, the step of transmitting the CPM message may include transmitting a CPM message corresponding to a dynamic CPM message at a first transmission interval, transmitting a CPM message corresponding to a full CPM message at a second transmission interval different from the first transmission interval, and further transmitting a CPM message corresponding to a full CPM message when a predefined event occurs. This has been described in FIGS. 22 to 23.

In one embodiment, a dynamic container may include object information related to at least one object detected by the sensor of the V2X communication device. The static container may include sensor information related to the sensor of the V2X communication device. The object information may correspond to a POC container or may be information/data included in a POC container. Alternatively, the sensor information may correspond to an FoVC container or may be information/data included in an FoVC container. This has been described in FIG. 12 in relation to the first type CPM message structure.

In one embodiment, a dynamic container may include dynamic object information having a dynamic characteristic among object information related to at least one object detected by the sensor of the V2X communication device, and may include dynamic sensor information having a dynamic characteristic among sensor information related to the sensor of the V2X communication device. A static container may include static object information having a static characteristic among object information and static sensor information having a static characteristic among sensor information. Dynamic object information may correspond to a DPOC or may be information/data included in a DPOC. Dynamic sensor information may correspond to a DFoVC or maybe information/data included in a DFoVC. Static object information may correspond to an SPOC or may be information/data included in an SPOC. Static sensor information may correspond to an SFoVC or may be information/data included in an SFoVC. This has been described in FIG. 13 in related to the second type CPM message structure.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

MODE FOR INVENTION

Those skilled in the art will understand that the disclosure may be changed and modified in various ways without departing from the spirit or range of the disclosure. Accordingly, the disclosure is intended to include all the changes and modifications provided by the appended claims and equivalents thereof.

In this disclosure, both the apparatus and the method have been described, and the descriptions of both the apparatus and method may be complementarily applied.

Various embodiments have been described in the best form for implementing the disclosure.

INDUSTRIAL APPLICABILITY

The disclosure is used in a series of V2X communication fields.

Those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A method of transmitting, by a V2X communication apparatus of a vehicle, a collective perception message (CPM) message, the method comprising:
 determining a transmission mode of the CPM message for generating collective perception for at least one object detected by the V2X communication apparatus; and
 transmitting the CPM message based on (i) the transmission mode and (ii) a transmission timing,
 wherein the CPM message corresponds to any one of a dynamic CPM message for transmitting dynamic data or a full CPM message for transmitting dynamic data and static data,
 wherein the dynamic CPM message includes a dynamic container including dynamic data,
 wherein the full CPM message includes a dynamic container including the dynamic data and a static container including the static data,
 wherein the transmission timing includes (i) a first transmission timing at which the dynamic CPM message is transmitted and (ii) a second transmission timing at which the full CPM message, and
 wherein a number of the first transmission timing is more than a number of the second transmission timing.

2. The method of claim 1, further comprising:
 based on that the transmission mode is an interval transmission mode,
 transmitting the dynamic CPM message at the first transmission timing within a first transmission interval, or
 transmitting the full CPM message at the second transmission timing within a second transmission interval different from the first transmission interval.

3. The method of claim 2,
 wherein the first transmission interval is shorter than the second transmission interval.

4. The method of claim 1, further comprising:
 based on that the transmission mode is an event trigger transmission mode,
 periodically transmitting the dynamic CPM message at the first transmission timing, or
 transmitting the full CPM message at the second transmission timing determined based on a predefined event occurring.

5. The method of claim 1, further comprising:
 based on that the transmission mode is a hybrid transmission mode,
 transmitting the dynamic CPM message at the first transmission timing within a first transmission interval,
 transmitting the full CPM message at the second transmission timing within a second transmission interval different from the first transmission interval, and
 further transmitting a CPM message corresponding to the full CPM message at the second transmission timing determined based on a predefined event occurring.

6. The method of claim 1,
 wherein the dynamic container includes object information related to at least one object detected by a sensor of the V2X communication apparatus, and
 wherein the static container includes sensor information related to the sensor of the V2X communication apparatus.

7. The method of claim 1,
 wherein the dynamic container includes dynamic object information having a dynamic characteristic among object information related to the at least one object detected by a sensor of the V2X communication apparatus, and includes dynamic sensor information having a dynamic characteristic among sensor information related to the sensor of the V2X communication apparatus, and
 wherein the static container includes static object information having a static characteristic among the object information and includes static sensor information having a static characteristic among the sensor information.

8. A V2X communication apparatus of a vehicle, comprising:
 a memory storing data;
 a communication unit transmitting or receiving a radio signal including a collective perception message (CPM) message; and
 a processor configured to control the memory and the communication unit, wherein the processor is configured to:
determine a transmission mode of the CPM message for generating collective perception for at least one object detected by the V2X communication apparatus, and
transmit the CPM message based on the transmission mode and (ii) a transmission timing,
wherein the CPM message corresponds to any one of a dynamic CPM message for transmitting dynamic data or a full CPM message for transmitting dynamic data and static data,
wherein the dynamic CPM message includes a dynamic container including dynamic data,
wherein the full CPM message includes a dynamic container including the dynamic data and a static container including the static data,
wherein the transmission timing includes (i) a first transmission timing at which the dynamic CPM message is transmitted and (ii) a second transmission timing at which the full CPM message, and
wherein a number of the first transmission timing is more than a number of the second transmission timing.

9. The V2X communication apparatus of claim 8, wherein the processor is further configured to:
based on that the transmission mode is an interval transmission mode,
transmit the dynamic CPM message at the first transmission timing within a first transmission interval, or
transmit the full CPM message at the second transmission timing within a second transmission interval different from the first transmission interval.

10. The V2X communication apparatus of claim 9,
wherein the first transmission interval is shorter than the second transmission interval.

11. The V2X communication apparatus of claim 8, wherein the processor is further configured to:
based on that the transmission mode is an event trigger transmission mode,
periodically transmit the dynamic CPM message at the first transmission timing, or
transmit the full CPM message at the second transmission timing determined based on a predefined event occurring.

12. The V2X communication apparatus of claim 8, wherein the processor is further configured to:
based on that the transmission mode is a hybrid transmission mode,
transmit the dynamic CPM message at the first transmission timing within a first transmission interval,
transmit the full CPM message at the second transmission timing within a second transmission interval different from the first transmission interval, and
further transmit a CPM message corresponding to the full CPM message at the second transmission timing determined based on a predefined event occurring.

13. The V2X communication apparatus of claim 8,
wherein the dynamic container includes object information related to at least one object detected by a sensor of the V2X communication apparatus, and
the static container includes sensor information related to the sensor of the V2X communication apparatus.

14. The V2X communication apparatus of claim 8,
wherein the dynamic container includes dynamic object information having a dynamic characteristic among object information related to the at least one object detected by a sensor of the V2X communication apparatus, and includes dynamic sensor information having a dynamic characteristic among sensor information related to the sensor of the V2X communication apparatus, and
wherein the static container includes static object information having a static characteristic among the object information and includes static sensor information having a static characteristic among the sensor information.

* * * * *